(12) United States Patent
Iida

(10) Patent No.: US 11,275,536 B2
(45) Date of Patent: Mar. 15, 2022

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Toshihiko Iida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/926,495

(22) Filed: Jul. 10, 2020

(65) Prior Publication Data
US 2021/0026578 A1 Jan. 28, 2021

(30) Foreign Application Priority Data
Jul. 24, 2019 (JP) .............................. JP2019-136292

(51) Int. Cl.
*G06F 3/12* (2006.01)
(52) U.S. Cl.
CPC .......... *G06F 3/1214* (2013.01); *G06F 3/1248* (2013.01); *G06F 3/1268* (2013.01)

(58) Field of Classification Search
None
See application file for complete search history.

(56) References Cited

U.S. PATENT DOCUMENTS

| 2010/0118337 A1* | 5/2010 | Kiuchi | G06F 3/1205 358/1.15 |
| 2013/0335773 A1* | 12/2013 | Chiba | G06F 3/1205 358/1.15 |

FOREIGN PATENT DOCUMENTS

JP 2011-147179 A 7/2011

\* cited by examiner

*Primary Examiner* — Dov Popovici
(74) *Attorney, Agent, or Firm* — Canon U.S.A., Inc. IP Division

(57) ABSTRACT

Part of a received job ticket is analyzed, and an acquisition request for a print file is transmitted to an external apparatus based on a result of the analysis. The job ticket is analyzed, and printing is controlled based on a result of the analysis and the print file acquired from the external apparatus based on the acquisition request to the external apparatus.

15 Claims, 16 Drawing Sheets

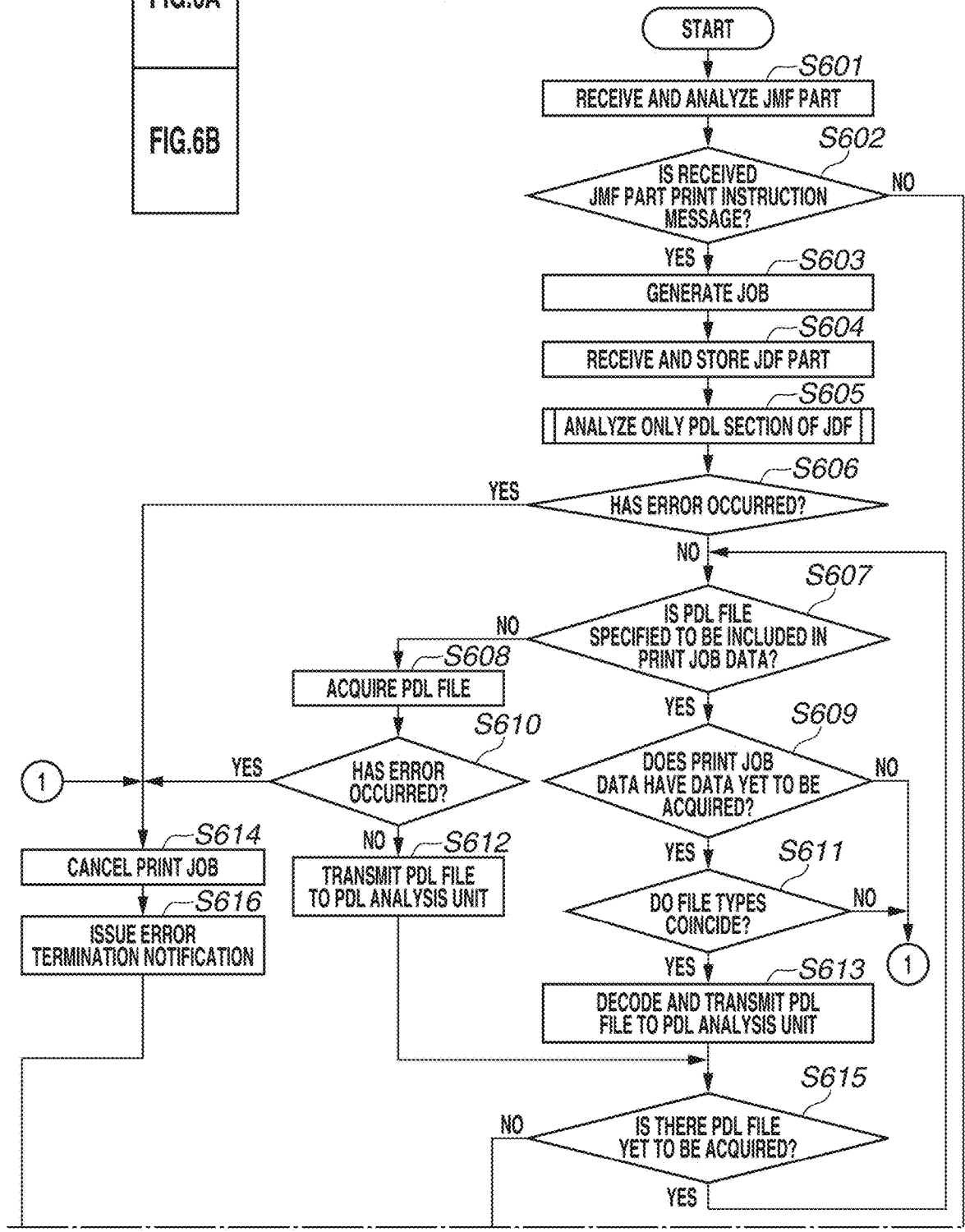

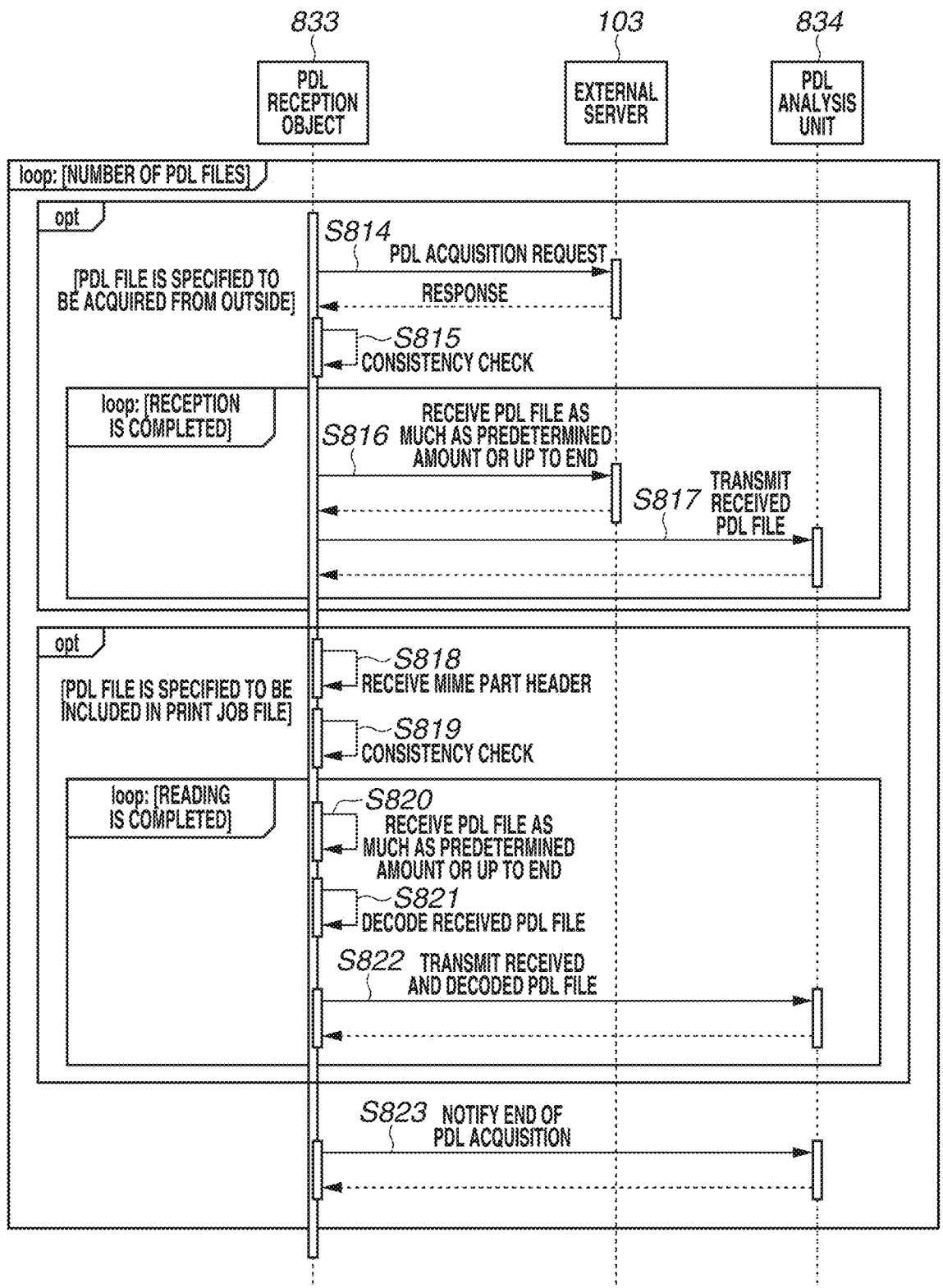

FIG.10B

```xml
<?xml version="1.0" encoding="UTF-8" standalone="no"?>
<JDF xmlns="http://www.CIP4.org/JDFSchema_1_1" xmlns:cj="http://www.www.canon.com/ins/CanonJDF" Activation="Active"
Category="DigitalPrinting" DescriptiveName="Job" ICSVersions="IDP_L1-1.0 Base_L0-1.0" ID="ID01" JobID="JobID01"
JobPart ID="JobPart_ID01" MaxVersion="1.2" Status="Ready" Type="Combined"Type="LayoutPreparation
Imposition Interpreting Rendering DigitalPrinting Stitching" Version="1.2" cj:OwnerName="User">
  <ResourcePool>
    <RunList Class="Parameter" ID="IDRL" PartIDKeys="Run" Status="Available">
      <RunList Run="0">
        <LayoutElement>
          <FileSpec MimeType="application/pdf" URL="cid:Content01"/>
        </LayoutElement>
      </RunList>
      <RunList Run="1">
        <LayoutElement>
          <FileSpec MimeType="application/pdf" URL="http://172.12.13.123/document.pdf"/>
        </LayoutElement>
      </RunList>
    </RunList>
    <LayoutPreparationarams Class="Parameter" ID="IDLPP" Sides="OneSideFront" Status="Available"/>
    <ColrantControl Class="Parameter" ID="IDCC" Status="Available"/>
    <InterpretingParams Class="Parameter" ID="IDIP" Status="Available"/>
    <RenderingParams Class="Parameter" ID="IDRP" Status="Available"/>
    <DigitalPrintingParams Class="Parameter" ID="IDDPP" Status="Available"/>
      <MediaRef rRef="MED_000"/>
    </DigitalPrintingParams>
    <Conponent Class="Quantity" ComponentType="PartialProduct" ID="IDC_DPP" Status="Unavailable"/>
    <StitchingParams Class="Parameter" ID="IDST" NoOp="false" Status="Available" StitchType="Corner"/>
    <Conponent Class="Quantity" ComponentType="FinalProduct" ID="IDC_ST" Status="Unavailable"/>
    <Media Class="Consumable" Dimension="842 595" ID="MED_000" Status="Available"/>
  </ResourcePool>
  <ResourceLinkPool>
    <LayoutPreparationParamsLink CombinedProcessIndex="0" Usage="Input" rRef="IDLPP"/>
    <RunListLink CombinedProcessIndex="01" Usage="Input" rRef="IDRL"/>
    <ColorantControlLink CombinedProcessIndex="2 4" Usage="Input" rRef="IDCC"/>
    <InterpretingParamsLink CombinedProcessIndex="2" Usage="Input" rRef="IDIP"/>
    <RenderingParamsLink CombinedProcessIndex="3" Usage="Input" rRef="IDRP"/>
    <DigitalPrintingParams LinkCombinedProcessIndex="4" Usage="Input" rRef="IDDPP"/>
    <ConponentLink Amount="1" CombinedProcessIndex="4" Usage="Output" rRef="IDC_DPP"/>
    <ConponentLink CombinedProcessIndex="5" Orientation="Rotate0" Usage="Input" rRef="IDC_DPP"/>
    <StitchingParamsLink CombinedProcessIndex="5" Usage="Input" rRef="IDST"/>
    <ConponentLink CombinedProcessIndex="5" Usage="Output" rRef="IDC_ST"/>
    <MediaLink CombinedProcessIndex="4" Usage="Input" rRef="MED_000"/>
  </ResourceLinkPool>
</JDF>
```

FIG.11A

```
<?xml version="1.0" encoding="utf-8"?>
<JMF xmlns="http://www.CIP4.org/JDFSchema_1_1"xmlns:xsi="http://www.w3.org/2001/XMLSchema-instance"DeviseID="01234567"
SenderID="01234567"TimeStamp="2019-05-23T20:33:28+09:00"Version="1.3"MaxVersion="1.3"
ICSVersions="Base_L0-1.0 Base_L0-1.0 IDP_L1-1.0 Base_L0-1.3 Base_L1-1.3 Base_L2-1.3 JMF_L1-1.3 JMF_L2-1.3">
  <Response ID="ID20190523203321"Type="SubmitQueueEntry"Time="2019-05-23T20:33:27+09:00"xsi:type="ResponseSubmitQueueEntry"
    refID="ID12345"ReturnCode="0">
    <Queue Status="Waiting"DeviceID="ZZZ99999"/>
    <QueueEntry JobID="JobID01"JobPartID="JobPartID01"QueueEntryID="1"Status="Waiting"SubmissionTime="2019-05-23T20:33:26+09:00"/>
  </Response>
</JMF>
```

```
<?xml version="1.0" encoding="utf-8"?>
<JMF xmlns="http://www.CIP4.org/JDFSchema_1_1"xmlns:xsi="http://www.w3.org/2001/XMLSchema-instance"DeviseID="01234567"
SenderID="01234567"TimeStamp="2019-05-23T20:23:47+09:00"Version="1.3"MaxVersion="1.3"
ICSVersions="Base_L0-1.0 Base_L0-1.0 IDP_L1-1.0 Base_L0-1.3 Base_L1-1.3 Base_L2-1.3 JMF_L1-1.3 JMF_L2-1.3">
  <Response ID="ID20190523203321"Type="SubmitQueueEntry"Time="2019-05-23T20:23:46+09:00"xsi:type="ResponseSubmitQueueEntry"
    refID="ID12345"ReturnCode="1">
    <Queue Status="Running"DeviceID="ZZZ99999"/>
    <QueueEntry JobID="JobID01"JobPartID="JobPartID01"QueueEntryID="2"Status="Aborted"SubmissionTime="2019-05-23T20:23:45+09:00"/>
    <Notification Class="Fatal"Type="Error"TimeStamp="2019-05-23T20:23:47+09:00">
      <Comment Language="en"Name="Description">
        Failed to download PDL file. : http://172.12.13.123/document.pdf
      </Comment>
      <ErrorElement ErrorID="108062370"/>
    </Notification>
  </Response>
</JMF>
```

| Error generating factor | Error message |
|---|---|
| Unsupported PDL file type | Specified PDL type is not supported. |
| XML syntax error | XML syntax error. |
| No PDL specification | No PDL specifies.At least one PDL file must be specified. |
| Too many PDL files are specified | Number of PDL files in JDF is over the limit. |
| No URL or MimeType specification | URL and Mime Type must be specified in File Spec element. |
| Unsupported scheme | Unsupported URL scheme. |
| PDL file has failed to be acquired | Failed to download PDL file. |
| PDL file types do not match | Mismatch between file type in JDF and that of the actual file. |
| Too many files are acquired and transmitted | PDL files in prnter has reached the maximum number. |
| Insufficient number of PDL parts | Less PDL files in MIME. |

1120, 1121, 1122

IMAGE FORMING APPARATUS, METHOD FOR CONTROLLING IMAGE FORMING APPARATUS, AND STORAGE MEDIUM

BACKGROUND

Field of the Disclosure

The present disclosure relates to processing in printing image data.

Description of the Related Art

As the speed and image quality of an electrophotographic printing apparatus and an inkjet printing apparatus have improved in recent years, a printing method called print on demand (POD) for directly printing digital data without performing a plate making process or a pressing process involved in conventional offset printing has been put to practical use.

POD is capable of small-lot multi-product printing and quick delivery, and enables zero inventory operation. To enable handling of various print products, job tickets such as in Job Description Format (JDF), for example, are used to implement detailed settings job by job. A job ticket can include various specifications related to printing, such as layout, sheet feeding, sheet discharge, finishing, and color-related specifications such as a profile. JDF can further include specifications called page exceptions in addition to the specifications about the entire job. By using the page exceptions, different specifications can be made page by page by defining partitions to be constructed with a page as a minimum unit, whereby more diversified products can be generated.

A JDF job ticket may be transmitted as a print job along with a page description language (PDL) file that is a print file. Alternatively, the PDL file may be stored in an accessible external server, and the JDF job ticket may specify only the path of the PDL file. The use of such a specification method enables the sender to submit the print job without taking into account encoding and format conversion of the PDL file. Japanese Patent Application Laid-Open No. 2011-147179 discusses a technique where a printing machine analyzes a received JDF job ticket, and acquires and analyzes a PDL file only if the settings specified by the JDF job ticket are executable on the printing machine.

As discussed in Japanese Patent Application Laid-Open No. 2011-147179, the job ticket such as in JDF may include a specification of the Uniform Resource Locator (URL) of a print file so that the print file may be acquired from the specified URL instead of simultaneously transmitting the print file in giving a print instruction. Such a specification method is convenient for the submitter of the job, whereas performance of the image forming apparatus drops because the PDL file is acquired after the job ticket is fully analyzed. Since the path of the PDL file stored outside is described in the JDF job ticket, the PDL file is unable to be acquired unless the JDF job ticket is analyzed. Starting the acquisition of the PDL file based on the analysis of the JDF job ticket (full analysis of the JDF job ticket) delays the start of printing and causes a drop in the printing efficiency.

SUMMARY

Embodiments of the present disclosure are directed to providing a technique for enabling printing with improved performance compared to heretofore in acquiring and printing a print file based on a job ticket.

According to embodiments of the present disclosure, an image forming apparatus includes a reception unit configured to receive a job ticket, a first analysis unit configured to analyze part of the job ticket, a transmission unit configured to transmit an acquisition request for a print file to an external apparatus based on a result of analysis by the first analysis unit, a second analysis unit configured to analyze the job ticket, and a control unit configured to control printing based on a result of analysis by the second analysis unit and the print file acquired from the external apparatus based on the acquisition request to the external apparatus.

Further features of the present disclosure will become apparent from the following description of exemplary embodiments with reference to e attached drawings.

BRIEF DESCRIPTION OF THE DRAWINGS

FIG. 6, which includes FIG. 6A and FIG. 6B, is a flowchart for describing a processing flow of a control unit when a job request is accepted from the information processing apparatus.

FIG. 8B is a sequence diagram for describing a processing flow of the entire print processing system when a job is accepted.

FIG. 10B illustrates an example of the job ticket.

FIGS. 11A and 11B illustrate examples of response messages that the image forming apparatus transmits to the information processing apparatus as a response to a job request. FIG. 11C illustrates examples of error-indicating character strings included in the response in case of an error.

DESCRIPTION OF THE EMBODIMENTS

Exemplary embodiments of the present disclosure will be described in detail below with reference to the drawings. The following exemplary embodiments are not intended to limit the disclosure. All combinations of features described in the exemplary embodiments are not deemed to be necessarily indispensable.

Description of System Configuration

Figure 1:
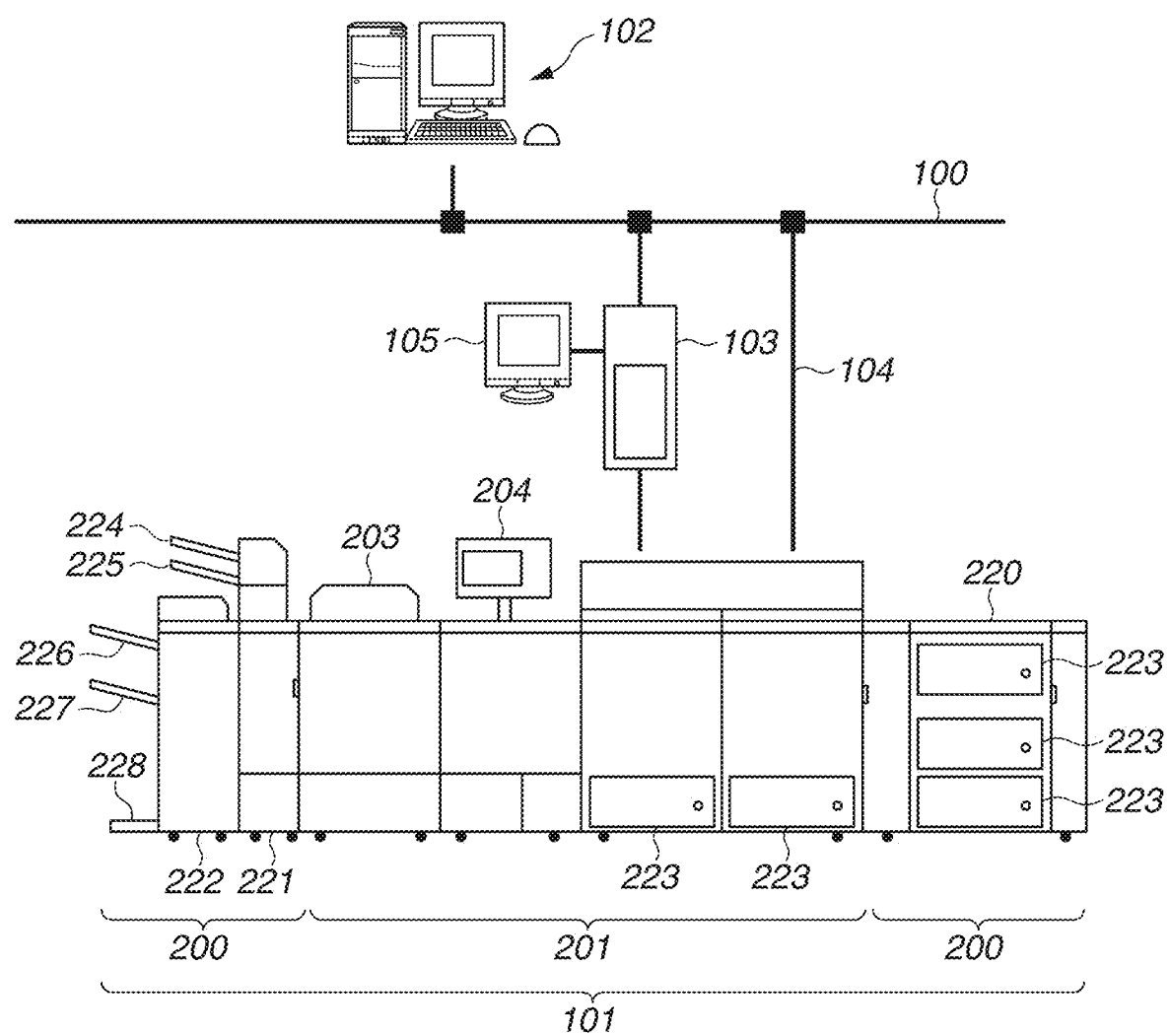
FIG. 1 is a system configuration diagram illustrating a configuration of an entire print processing system.

FIG. 1 is a block diagram illustrating a print processing system according to a first exemplary embodiment. In the present exemplary embodiment, a multifunction peripheral (MFP) 101 will be described as an example of an image forming apparatus, and an information processing apparatus 102 as an example of an information processing apparatus. The MFP (hereinafter, also referred to as the image forming apparatus) 101 and the information processing apparatus 102 are communicably connected with each other via a network 100.

While FIG. 1 illustrates a case where the print processing system includes one information processing apparatus, the image forming apparatus 101 may be communicably connected with a plurality of information processing apparatuses via the network 100. The print processing system according to the present exemplary embodiment is illustrated to include the image forming apparatus 101 and the information processing apparatus 102. However, this is not restrictive. For example, the image forming apparatus 101 may be referred to as a print processing system. In executing image formation processing that can be performed by the image forming apparatus 101 alone, such as a copy job, the information processing apparatus 102 connected to the network 100 may be omitted.

First, the information processing apparatus 102 will be described. The information processing apparatus 102 can execute various programs such as an application program for submitting a job. A printer driver having a function of converting print data into a printer language supported by the image forming apparatus 101 is installed on the information processing apparatus 102. A user who wants to perform printing can give a print instruction using any of various applications. The printer driver can convert data that the application outputs based on the print instruction into print data interpretable by the image forming apparatus 101, and transmit the print data to the image forming apparatus 101 connected to the network 100.

In the present exemplary embodiment, a personal computer (PC) will be described as an example of the information processing apparatus 102. However, the information processing apparatus 102 may be a portable information terminal such as a smartphone and a tablet terminal. The method for transmitting the print data to the image forming apparatus 101 may be modified as appropriate. The print data may be transmitted to the image forming apparatus 101 via a printing application or driver. The print data may be transmitted to the image forming apparatus 101 via a cloud server.

Next, the image forming apparatus 101 will be described. The image forming apparatus 101 has a reading function of reading an image on a sheet and a print function of printing an image on a sheet. The image forming apparatus 101 also has postprocessing functions such as binding a plurality of image-printed sheets, aligning a plurality of sheets, and discharging a plurality of sheets to a plurality of trays. Examples of the sheets include sheets of plain paper and thick paper, and film sheets.

In the present exemplary embodiment, the image forming apparatus 101 is described as an example of the image forming apparatus. However, the image forming apparatus may be a printer having no reading function, for example. In the present exemplary embodiment, the image forming apparatus 101 includes, as an example, various components to be described below.

An apparatus (external server) 103 having some of the functions of the image forming apparatus 101 and/or other accessory functions may be added to the MFP 101. In such a case, to the information processing apparatus 102, it appears that the apparatus 103 is providing the functions of the image forming apparatus 101 via the network 100. The apparatus 103 may be accompanied by various input and output devices similar to ones included in the information processing apparatus 102, like a monitor 105. Even in a case where the apparatus 103 is attached, the image forming apparatus 101 may be directly connected to the network 100 using a network cable 104.

The image forming apparatus 101 is configured so that a plurality of devices having different roles is connected with each other to enable complicated sheet processing. The components of the image forming apparatus 101 will be described below.

A printer unit 201 forms (prints) an image on a sheet fed from a sheet feed unit based on image data by using toner. A configuration and operation principle of the printer unit 201 are described below.

A light beam such as laser light modulated based on the image data is reflected by a rotating polygonal mirror (such as a polygon mirror) to produce scanning light, with which a photosensitive drum is irradiated. An electrostatic latent image formed on the photosensitive drum by the scanning light is developed by toner, and a resulting toner image is transferred to a sheet attached to a transfer drum. Such a series of image formation processes is performed using yellow (Y), magenta (M), cyan (C), and black (K) toners in succession, whereby a full color image is formed on the sheet. The printer unit 201 may be configured so that a spot color toner and a transparent toner can be transferred in addition to the four color toners. Thus, the sheet on which the full color image is formed on the transfer drum is conveyed to a fixing device. The fixing device includes a roller, a belt, and a heat source such as a halogen heater built in a roller. The fixing device melts the toners on the sheet to which the toner images have been transferred and fixes the toners to the sheet by heat and pressure.

The printer unit 201 of the image forming apparatus 101 according to the first exemplary embodiment is equipped with a scanner 203 and an operation unit 204. The operation unit 204 is located on top of the printer unit 201. The operation unit 204 provides various interfaces to be used by the user to make various settings of and operations on the printer unit 201 according to the first exemplary embodiment. The image forming apparatus 101 is further configured to allow various accessory devices to be attached in addition to the printer unit 201.

A high capacity sheet feeder 220 is a sheet feeder detachably attachable to the printer unit 201. The high capacity sheet feeder 220 includes a plurality of sheet feed units 223. Such a configuration enables the printer unit 201 to perform print processing on large amounts of sheets. An inserter 221 is a device used to insert a sheet or sheets on which no image is formed into sheets (products) produced by the printer unit 201. In FIG. 1, the inserter 221 includes two trays 224 and 225. The image forming apparatus 101 can be largely divided into three sections with the printer unit 201 as a border. In FIG. 1, the devices on the right of the printer unit 201 are referred to as feed system devices. A main role of the feed system devices is to successively supply sheets loaded therein to the printer unit 201 at appropriate timing. The devices also detect respective remaining amounts of sheets loaded therein. The printer unit 201 also includes sheet feed units 223 inside, which can perform functions equivalent to those of the feed system devices. In the following description, the sheet feed units 223 included in the printer unit 201 are also referred to as the feed system devices.

In FIG. 1, the devices on the left of the printer unit 201 are referred to as sheet treatment devices. The sheet treatment devices may also be referred to as sheet processing devices or postprocessing devices. The sheet processing devices perform processing such as applying various types of treatment to sheets of which the print processing is completed, and stacking sheets. In the following description, the foregoing feed system devices and the sheet treatment devices will be referred to collectively as a sheet processing apparatus 200.

Description of Image Forming Apparatus 101

Figure 2:
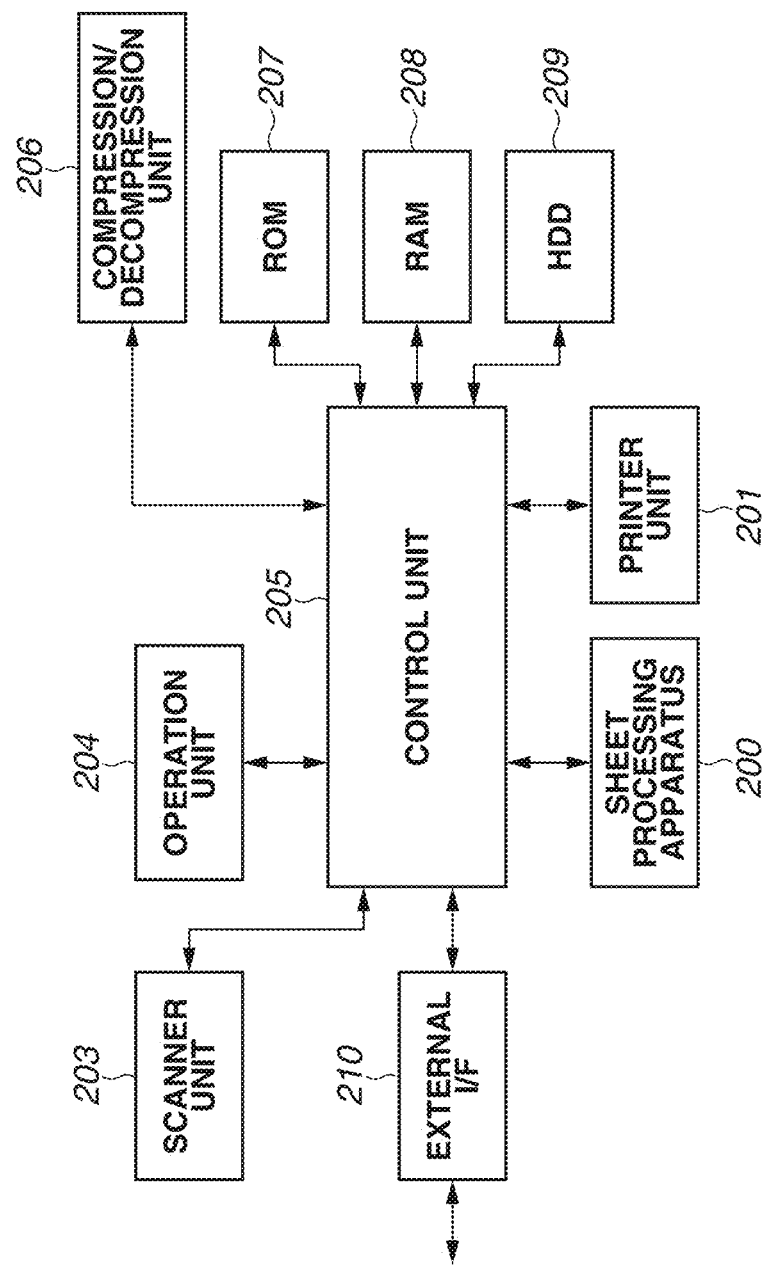
FIG. 2 is a hardware configuration diagram of an image forming apparatus.

FIG. 2 is a diagram for describing a hardware configuration of the image forming apparatus 101. The image forming apparatus 101 has the reading function of reading an image on a sheet and the print function of printing an image on a sheet. The image forming apparatus 101 also has the postprocessing functions such as binding a plurality of image-printed sheets, aligning a plurality of sheets, and discharging a plurality of sheets to a plurality of trays. Examples of the sheets include sheets of plain paper and thick paper, and film sheets. The image forming apparatus 101 illustrated in FIG. 2 is configured to include a plurality of devices having different roles, which is connected with each other to enable complicated sheet processing.

The image forming apparatus 101 also has a copy function of storing data accepted from the scanner unit 203 into a hard disk drive (HDD) 209, reading the data from the HDD 209, and printing the data by the printer unit 201. The image forming apparatus 101 also has a print function of storing job data received from an external apparatus via an external interface (I/F) 210, which is an example of a communication unit, into the HDD 209, reading the job data from the HDD 209, and printing the job data by the printer unit 201. The image forming apparatus 101 is an MFP having such a plurality of functions. The image forming apparatus 101 may be one capable of color printing or one capable of only monochrome printing. The scanner unit 203 reads a document image, applies image processing to image data acquired by reading the document image, and outputs the resulting image data.

A not-illustrated central processing unit (CPU) of a control unit 205 reads programs stored in a read-only memory (ROM) 207 and execute the programs, whereby various operations according to the first exemplary embodiment are performed by the image forming apparatus 101. A program for the control unit 205 to interpret page description language (PDL) data received from an external apparatus via the external I/F 210 and render the PDL data into raster image data (bitmap image data) is also stored in the ROM 207. Similarly, a program for the control unit 205 to interpret and process a job received from an external apparatus via the external I/F 210 is also stored in the ROM 207. Such programs are processed by software. The ROM 207 stores in advance a boot sequence program, font information, and various programs including the foregoing programs. Details of various programs stored in the ROM 207 will be described below. A random access memory (RAM) 208 is a readable and writable memory. The RAM 208 stores image data transmitted from the scanner unit 203 and the external I/F 210, various programs, and setting information.

The HDD 209 stores image data compressed by a compression/decompression unit 206. The HDD 209 is configured to be capable of retaining a plurality of pieces of data such as print data on jobs to be processed. The control unit 205 stores data on jobs to be processed input via various input units such as the scanner unit 203 and the external I/F 210 into the HDD 209, reads the data from the HDD 209, and outputs the data to the printer unit 201 to print the data. The control unit 205 also controls job data read from the HDD 209 so that the job data can be transmitted to an external apparatus via the external I/F 210. In such a manner, the control unit 205 performs various types of processing for outputting the data on the jobs to be processed stored in the HDD 209. The compression/decompression unit 206 compresses and decompresses image data stored in the RAM 208 and the HDD 209 by various compression methods such as Joint Bi-level Image Experts Group (JBIG) and Joint Photographic Experts Group (JPEG). The control unit 205 also controls operation of the sheet processing apparatus 200. The sheet processing apparatus 200 corresponds to the teed system devices and the sheet treatment devices described with reference to FIG. 1.

The external I/F 210 transmits and receives image data to/from a facsimile, a network-connected device, and/or a dedicated external apparatus. The HDD 209 stores various types of management information to be permanently store, modified, and managed by the image forming apparatus 101. The image forming apparatus 101 includes the printer unit 201 that performs print processing on the data on the jobs to be printed stored in the HDD 209. The image forming apparatus 101 also includes the operation unit 204 that corresponds to an example of a user I/F unit and includes a display unit. The control unit 205 included in the image forming apparatus 101 corresponds to an example of a control unit. The control unit 205 includes the CPU and controls processing and operation of various units included in the image forming apparatus 101 in a centralized manner. The ROM 207 stores programs for performing various types of processing of the flowcharts to be described below to be executed by the control unit 205. The ROM 207 also stores various control programs used in the first exemplary embodiment. The ROM 207 also stores a display control program for displaying various user interface (UI) screens on the display unit of the operation unit 204.

Description of Information Processing Apparatus 102

Figure 3:
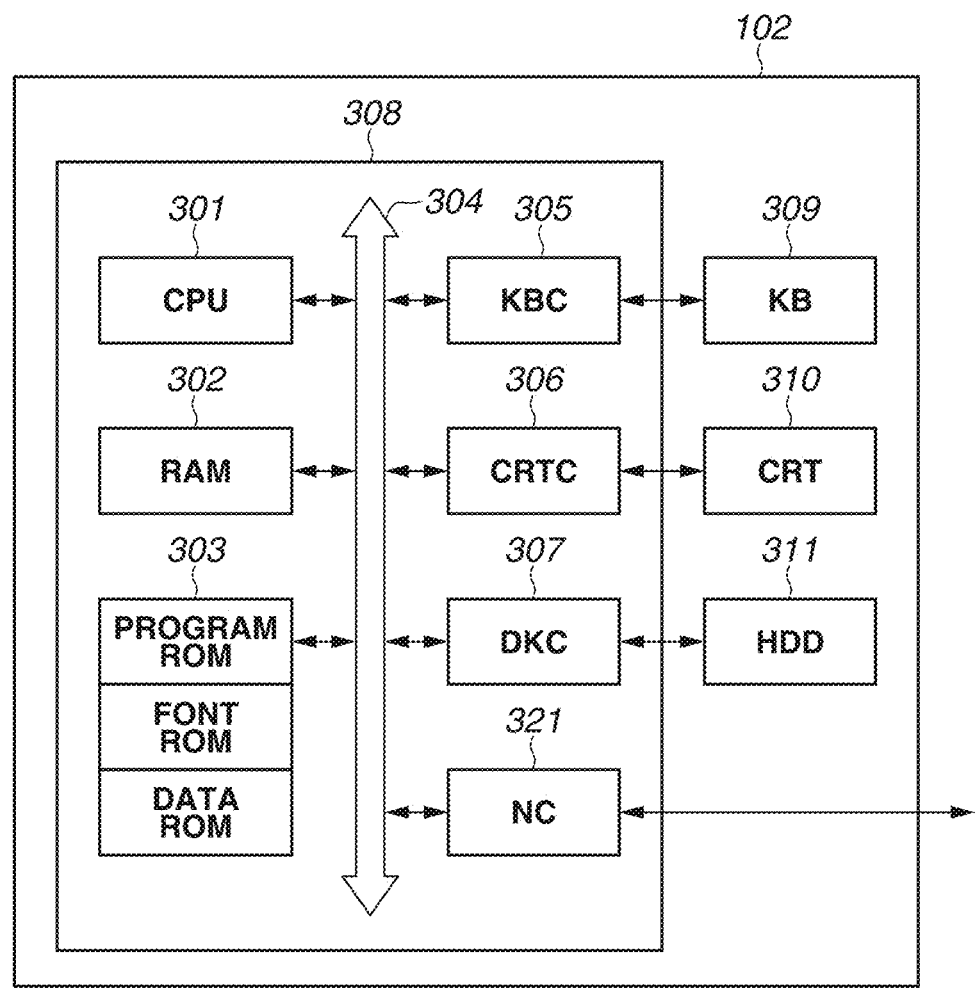
FIG. 3 is a hardware configuration diagram of an information processing apparatus.

FIG. 3 is a block diagram illustrating a configuration of the information processing apparatus (PC) 102 according to the first exemplary embodiment.

In FIG. 3, a CPU 301 executes programs including an operating system (OS), general applications, and a book-binding application that are stored in a program ROM included in a ROM 303 or loaded from an HDD 311 into a RAM 302. The ROM 303 also includes a font ROM and a data ROM. The RAM 302 functions as a main memory and a work area of the CPU 301. A keyboard controller (KBC) 305 controls inputs from a keyboard (KB) 309 and a pointing device (not illustrated). A display controller (CRTC) 306 controls display on a display unit (CRT) 310. A disk controller (DKC) 307 controls access to the HDD 311 where a boot program, various applications, font data, and user files are stored. A network controller (NC) 321 is connected to the network 100 and performs communication control processing with other devices connected to the network 100. A bus 304 connects the CPU 301, the RAM 302, the ROM 303, and various controllers, and conveys data signals and control signals.

Software Configuration Diagram of Image Forming Apparatus 101

Figure 4:
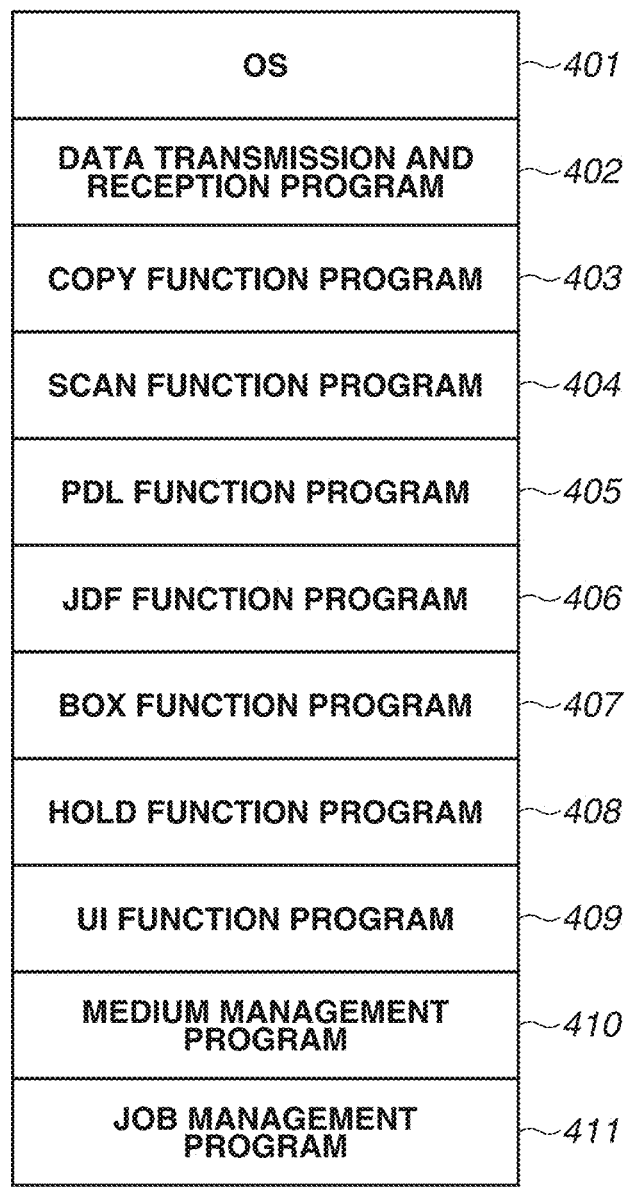
FIG. 4 is a software configuration diagram of the image forming apparatus.

FIG. 4 is a diagram for describing the programs on the image forming apparatus 101 according to the first exemplary embodiment. The programs are stored in the ROM 207, and read and executed by the control unit 205 of the image forming apparatus 101.

An OS 401 is a program intended to provide an execution environment for various programs for implementing the functions of the image forming apparatus 101. The OS 401 mainly provides a function of managing resources such as the memories of the image forming apparatus 101, i.e., the ROM 207, RAM 208, and HDD 209, and a function of basic input/output control on the components illustrated in FIG. 2.

A data transmission and reception program 402 performs transmission and reception processing when a data input or output request occurs via the external I/F 210. Specifically, the data transmission and reception program 402 includes a protocol stack such as Transmission Control Protocol/Internet Protocol (TCP/IP), and controls various types of data communication with external apparatuses connected via the network 100. The communication processing to be performed here is processing dedicated to the level of data packet transmission and reception and the communication processing of Hypertext Transfer Protocol (HTTP) servers, and does not include analysis processing about contents of received data to be described below. The data analysis processing is performed by the control unit 205 based on a description content of another program.

A copy function program 403 is a program for the control unit 205 to perform, when the user of the image forming apparatus 101 gives an instruction to perform a copy function from the operation unit 204, the copy function based on the instruction from the operation unit 204. The copy function performed by the control unit 205 includes the control unit 205 sequentially allocating the resources of the image forming apparatus 101 to various devices in appropriate order based on processing order and processing conditions described in the copy function program 403. Accordingly, the control unit 205 eventually controls execution of copy processing. The various devices include the scanner unit 203, the printer unit 201, the sheet processing apparatus 200, the HDD 209, the compression/decompression unit 206, and the RAM 208.

A scan function program 404 is a program for the control unit 205 to perform, when the user of the image forming apparatus 101 gives an instruction to perform a scan function from the operation unit 204, the scan function based on the instruction from the operation unit 204. The control unit 205 controls modules such as the scanner unit 203, the HDD 209, the compression/decompression unit 206, and the RAM 208 based on processing order and processing conditions described in the scan function program 404. The control unit 205 sequentially gives instructions on operation of such modules in appropriate order, whereby execution of scan processing is eventually controlled.

A PDL function program 405 is a program for the control unit 205 to perform a PDL function when PDL data (print job data) is received by the image forming apparatus 101 via the external I/F 210. The PDL function performed by the control unit 205 includes performing analysis processing on a specified PDL file and generating a print image. The analysis processing of the PDL file uses print settings acquired by a job description format (JDF) function program 406 analyzing JDF job data.

The JDF function program 406 is a program for the control unit 205 to perform a JDF function based on instructions from the external I/F 210 when the JDF job data is received by the image forming apparatus 101 via the external I/F 210. The JDF function performed by the control unit 205 includes performing analysis processing on a received JDF job data and generating print settings to be used for printing. The JDF function program 406 according to the first exemplary embodiment has a function of analyzing only a PDL section 1013 (see FIG. 10B) in the JDF job data to acquire the Uniform Resource Locator (URL) of a PDL file. The JDF function program 406 also includes a program for performing determination processing to determine whether the analyzed JDF job data includes a wrong setting, and making a setting change to resolve the wrong setting.

A box function program 407 is a program for the control unit 205 to perform, when the user of the image forming apparatus 101 gives an instruction to perform a box function from the operation unit 204, the box function based on the instruction from the operation unit 204. The control unit 205 sequentially gives instructions on operation of devices in appropriate order based on processing order and processing conditions described in the box function program 407, whereby box processing is performed. The devices include the scanner unit 203, the printer unit 201, the sheet processing apparatus 200, the HDD 209, the compression/decompression unit 206, and the RAM 208. By the box function, the control unit 205 can change the stored settings of job data stored in the HDD 209 and execute the job.

A hold function program 408 is a program to be executed by the control unit 205 when the user of the image forming apparatus 101 gives an instruction to perform a hold function from the operation unit 204. The hold function is a function of storing data to be printed in the HDD 209 of the image forming apparatus 101 until a print instruction is given by the user, and then performing printing based on the data for which a print instruction is accepted from the user. Using the hold function, the control unit 205 performs job-holding print processing by sequentially giving instructions on operation of devices in appropriate order based on processing order and processing conditions described in the hold function program 408. The devices include the printer unit 201, the sheet processing apparatus 200, the HDD 209, the compression/decompression unit 206, and the RAM 208. The control unit 205 can change the stored settings of the stored job data and print the job data.

A UI function program 409 is a program for controlling the operation unit 204. The UI function program 409 identifies the content of an input made by the user of the image forming apparatus 101 from the operation unit 204, causes an appropriate screen transition, and makes an appropriate processing request instruction to the control unit 205.

A medium management program 410 is a program for performing a management function related to sheets that the image forming apparatus 101 can use. Sheet related information managed by the medium management program 410 is stored in the HDD 209.

A job management program 411 is a program for the image forming apparatus 101 to manage information about a series of processes generated by programs including the copy function program 403, the PDL function program 405, and the JDF function program 406 as a job. A series of processes included in a job may include processes that can be simultaneously performed only in limited numbers, like a raster image processor (RIP) process and a printing process. The job management program 411 controls the order of such processes and also manages execution results (logs).

A PDL analysis unit 834, a JDF analysis unit 835, and a job management unit 832 (see FIG. 8A) are generated by the control unit 205 executing the PDL function program 405, the JDF function program 406, and the job management program 411. A processing flow of the PDL analysis unit 834, the JDF analysis unit 835, and the job management unit 832 will be described below with reference to FIGS. 8A, 8B, and 9.

Software Configuration Diagram of Information Processing Apparatus 102

Figure 5:
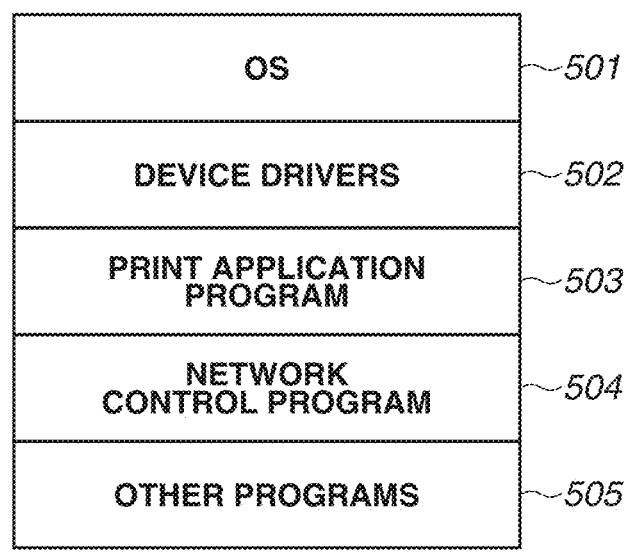
FIG. 5 is a software configuration diagram of the information processing apparatus.

FIG. 5 is a diagram illustrating a configuration of the programs included in the information processing apparatus 102 according to the first exemplary embodiment.

An OS 501 is a program intended to provide an execution environment for various programs for implementing the functions of the information processing apparatus 102. The OS 501 provides a function of managing resources such as the memories of the information processing apparatus 102, i.e., the ROM 303, the RAM 302, and the HDD 311.

Device drivers 502 are programs for controlling various pieces of hardware connected to the information processing apparatus 102. The device drivers 502 include programs for controlling the KBC 305, the CRTC 306, and the DKC 307.

A print application program 503 refers collectively to programs that run on the information processing apparatus 102 and are intended to provide various functions and services for the user of the print processing system. The print application program 503 has a function of generating or editing print job data. The print application program 503 also has a function of converting various print specifications set on a not-illustrated setting screen of the print application program 503 into corresponding print settings. The print application program 503 further has a function of selecting a print setting file stored in the HDD 311 and generating print job data. The print application program 503 can convert print settings into a job ticket in a PDL command format or JDF, or combining the converted job ticket with data to be printed to generate print job data.

A network control program 504 is a program to be executed in transmitting the print job data generated by the print application program 503 to the image forming apparatus 101 connected via the network 100. The network control program 504 can be configured to also have functions of transmitting print data and acquiring progress information about a print job executed by the image forming apparatus 101 after transmission.

Other programs 505 include a group of programs that do not fall into any of the foregoing classifications. A detailed description thereof will be omitted.

Flowchart During Job Acceptance

Figure 6B:
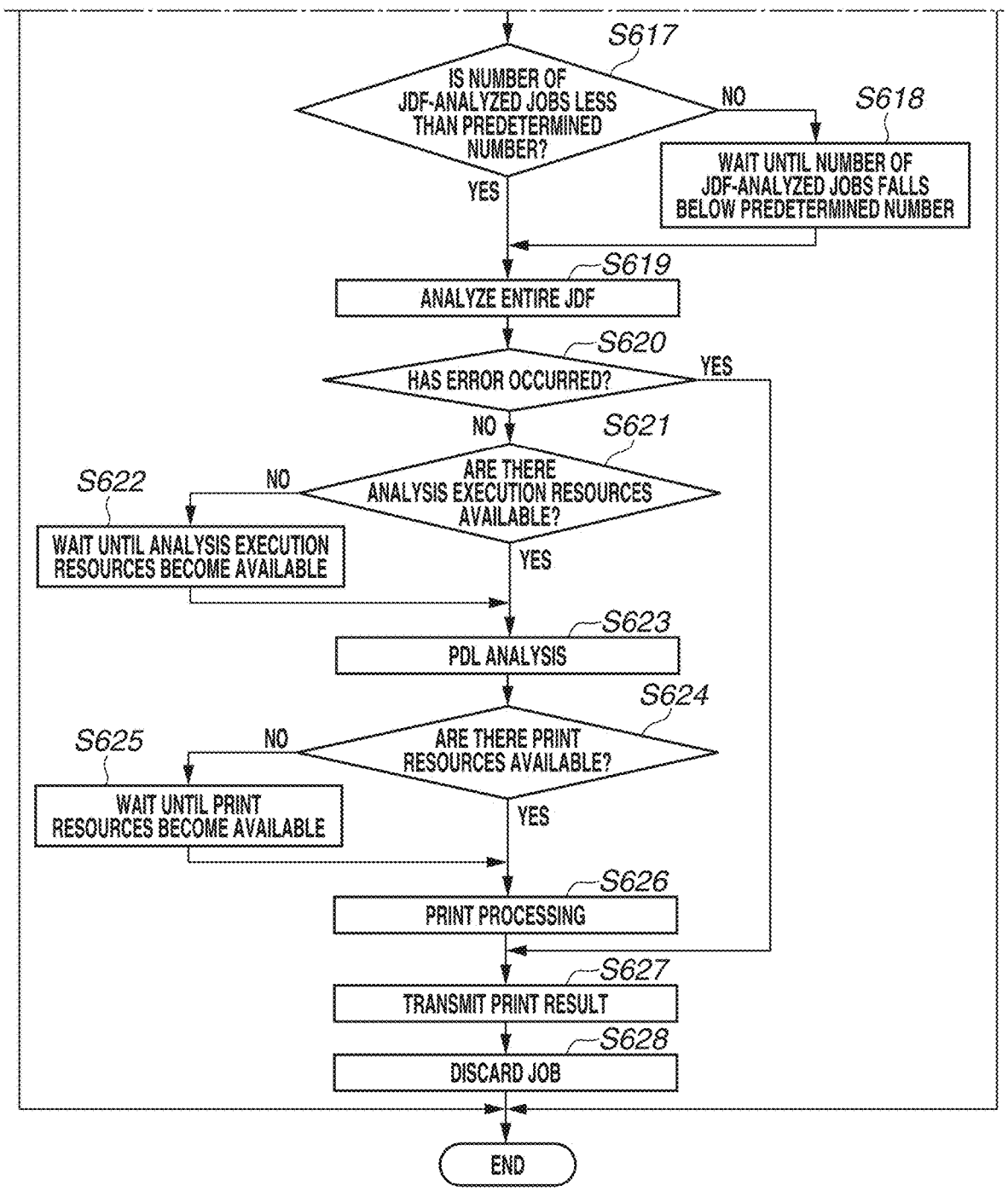

FIG. 6 is a flowchart illustrating a processing flow of the control unit 205 during job acceptance. The processing flow starts when the control unit 205 accepts a print job from the information processing apparatus 102 via the external I/F 210. FIG. 6 illustrates the processing flow with a focus on the accepted print job.

In step S601, the control unit 205 receives a Job Messaging Format (JMF) part of print job data transmitted from the information processing apparatus 102 via the external I/F 210, and analyzes the JMF part by the JDF analysis unit 835. A structure of the print job data will be described below with reference to FIG. 10A. After reception and analysis of the JMF part, the processing proceeds to step S602.

In step S602, the control unit 205 determines whether the received JMF part is a print instruction message based on the analysis of the JMF part. The print instruction message refers to a SubmitQueueEntry command. If the received JMF part is the print instruction message (YES in step S602), the processing proceeds to step S603. If not (NO in step S602), the processing flow ends. The processing flow also ends if the JMF part contains an error.

In step S603, the control unit 205 generates a job. After the job generation, the processing proceeds to step S604.

In step S604, the control unit 205 receives a JDF part of the print job data transmitted from the information processing apparatus 102 via the external I/F 210, and stores the JDF part in a file. After the storage, the processing proceeds to step S605.

In step S605, the control unit 205 analyzes only a PDL section of the JDF part (analyzes part of the JDF part; first analysis), and stores necessary values. The values to be stored include at least the URL of a PDL file and the value of an attribute specifying the file type. The PDL section (print file description section) of the JDF part will be described below with reference to FIG. 10B. The control unit 205 may analyze the JDF part by reading the JDF file stored in step S604 or by directly analyzing the data read from the external I/F 210 in step S604. To minimize memory use and prevent an adverse effect on the printing performance, the analysis here is desirably completed in a short time. The analysis to be performed will be described below with reference to FIG. 7. After the end of the analysis of the PDL section, the processing proceeds to step S606.

In step S606, the control unit 205 determines whether an error has occurred during the analysis of the PDL section in step S605. Possible errors to be determined will be described below with reference to FIG. 11C. If an error has occurred (YES in step S606), the processing proceeds to step S614. If not (NO in step S606), the processing proceeds to step S607.

In step S607, the control unit 205 refers to the URL of the PDL file stored in step S605, and determines whether the PDL file is specified to be included in print job data for transmission. If a plurality of PDL files is specified, the control unit 205 performs determination on the PDF files in the order of specification, and processes the PDL files one by one. If a value with a prefix "cid:" is specified in an URL attribute in JDF, the PDL file is specified to be included in the print job data for transmission. If the PDL file is specified to be included in the print job data (YES in step S607), the processing proceeds to step S609. If not (NO in step S607), the processing proceeds to step S608.

In step S608, the control unit 205 refers to the URL of the PDL file stored in step S605, issues an acquisition request for the PDL file stored outside, and acquires the PDL file. Examples of the acquisition method include the HTTP, Server Message Block (SMB), and Web Distributed Authoring and Versioning (WebDAV). One specified by the URL is used.

In step S609, the control unit 205 determines whether the print job data has data yet to be acquired. If the JDF file is transmitted by the HTTP, the print job data is transmitted in a Multipurpose Internet Mail Extensions (MIME) format. A MIME message can be divided into separate parts by data type. If the print job data has data yet to be acquired (YES in step S609), the processing proceeds to step S611. If not (NO in step S609), the processing proceeds to step S614.

In step S610, the control unit 205 determines whether an error has occurred during the acquisition of the PDL file in step S608. Possible errors will be described below with reference to FIG. 11C. If an error has occurred (YES in step S610), the processing proceeds to step S614. If not (NO in step S610), the processing proceeds to step S612.

In step S611, the control unit 205 determines whether the file type of the data yet to be acquired in the print job data coincides with the file type specified by the JDF part acquired in step S605. In the case of the MIME format, the file type specified can be determined by referring to the value of "Content-Type" in the header at the beginning of the part, if the file types coincide (YES in step S611), the processing proceeds to step S613. If not (NO in step S611), the processing proceeds to step S614.

In step S612, the control unit 205 transmits the acquired PDL file to the PDL analysis unit 834. In fact, the control unit 205 reads the PDL file as much as a predetermined amount and transmits that much data to the PDL analysis unit 834 successively to reduce storage and memory use. After the transmission to the PDL analysis unit 834, the processing proceeds to step S615.

In step S613, the control unit 205 transmits the PDL file acquired from the print job data to the PDL analysis unit 834. The PDL file transmitted in the MIME format is encoded by a Base64 format, and is therefore decoded before transmission. Again, the control unit 205 processes the PDL file in predetermined amounts. After the transmission to the PDL analysis unit 834, the processing proceeds to step S615.

In step S614, the control unit 205 cancels the accepted print job. The control unit 205 stops acquiring the PDL data, and issues a delete request for a job instruction registered in the job management unit 832. If the PDL file has been transmitted to the PDL analysis unit 834, the control unit 205 issues a delete instruction for the PDL file to the PDL analysis unit 834, After the cancellation of the print job, the processing proceeds to step S616.

in step S615, the control unit 205 determines whether there is a PDL file yet to be acquired. If there is a PDL file yet to be acquired (YES in step S615), the processing proceeds to step S607. In step S607, the control unit 205 processes the next PDL file. If there is no PDL file yet to be acquired (NO in step S615), the processing proceeds to step S617.

In step S616, the control unit 205 issues an error termination notification.

In step S617, the control unit 205 determines whether the number of JDF-analyzed jobs (job ticket-analyzed jobs) is less than a predetermined number. The predetermined number of JDF-analyzed jobs is a value determined by resource limitations, and indicates the number of jobs of which the entire JDF parts can be analyzed and the values can be stored in the RAM 208. The number of JDF-analyzed jobs increases and decreases as JDF parts are analyzed in step S619 and jobs are discarded in step S628. If the number of JDF-analyzed jobs is less than the predetermined number (YES in step S617), the processing proceeds to step S619. If not (NO in step S617), the processing proceeds to step S618.

In step S618, the control unit 205 waits until the number of JDF-analyzed jobs falls below the predetermined number. The number of JDF-analyzed jobs decreases as a previously JDF-analyzed job is discarded in step S628. If the number of JDF-analyzed jobs falls below the predetermined number, the processing proceeds to step S619.

In step S619, the control unit 205 analyzes the JDF part stored in a file in step S604 (second analysis). Unlike when only the PDL section is analyzed and stored in step S605, the analysis method here is not limited in particular. The control unit 205 analyzes the entire JDF part and stores the resulting values. After the end of the analysis, the processing proceeds to step S620.

In step S620, the control unit 205 determines whether an error has occurred in the JDF analysis in step S619. Examples of the error include an Extensible Markup Language (XML) syntax error, specification of a non-executable job, and a line-breaking error. If an error has occurred (YES in step S620), the processing proceeds to step S627. If not (NO in step S620), the processing proceeds to step S621.

In step S621, the control unit 205 determines whether the PDL analysis unit 834 has analysis execution resources available. The analysis execution resources are defined by the number of jobs that can be simultaneously analyzed. If there are analysis execution resources available (YES in step S621), the processing proceeds to step S623. If not (NO in step S621), the processing proceeds to step S622.

In step S622, the control unit 205 waits until the analysis execution resources of the PDL analysis unit 834 become available. The analysis execution resources become available as the analysis processing of a previously PDL-analyzed job is completed. If the analysis execution resources have become available, the processing proceeds to step S623.

In step S623, the control unit 205 analyzes the PDL file associated with the job by using the PDL analysis unit 834. The PDL analysis (analysis of the PDL file) includes RIP processing for reflecting the print settings specified by the JDF part to generate a print image. After the completion of the PDL analysis, the processing proceeds to step S624.

In step S624, the control unit 205 determines whether the printer unit 201 has print resources available. The print resources are usually allocated to the earliest accepted job among the jobs registered in the job management unit 832. If there are print resources available (YES in step S624), the processing proceeds to step S626. If not (NO in step S624), the processing proceeds to step S625.

In step S625, the control unit 205 waits until the print resources of the printer unit 201 become available. The print resources become available as the preceding job(s) being printed complete(s) printing. If the print resources have become available, the processing proceeds to step S626.

In step S626, the control unit 205 performs print processing for forming the print image generated in step S623 on a sheet. The print processing may include preprocessing after the generation of the print image. Examples of the preprocessing include imposition processing. After the completion of the printing, the processing proceeds to step S627.

In step S627, the control unit 205 transmits a print result to a specified transmission destination. The transmission destination may be the information processing apparatus 102 from which the print job data is accepted or another device on the network 100. The print result includes information indicating at least whether the printing is normally completed or aborted due to occurrence of an error or acceptance of a cancel operation. In the case of using JDF, the transmission destination is specified as a value of ReturnJMF attribute in the JMF part.

In step S628, the control unit 205 discards the job registered in the job management unit 832. This reduces the number of JDF-analyzed jobs in value. After the discard of the job, the processing flow ends.

While the control unit 205 determines, in step S617, whether the number of JDF-analyzed jobs is less than a predetermined number, the control unit 205 may determine whether the number of JDF-analyzed jobs is less than or equal to a predetermined number, and may advance the following processing based on the determination.

Flowchart for Analyzing PDL Section of JDF

Figure 7:
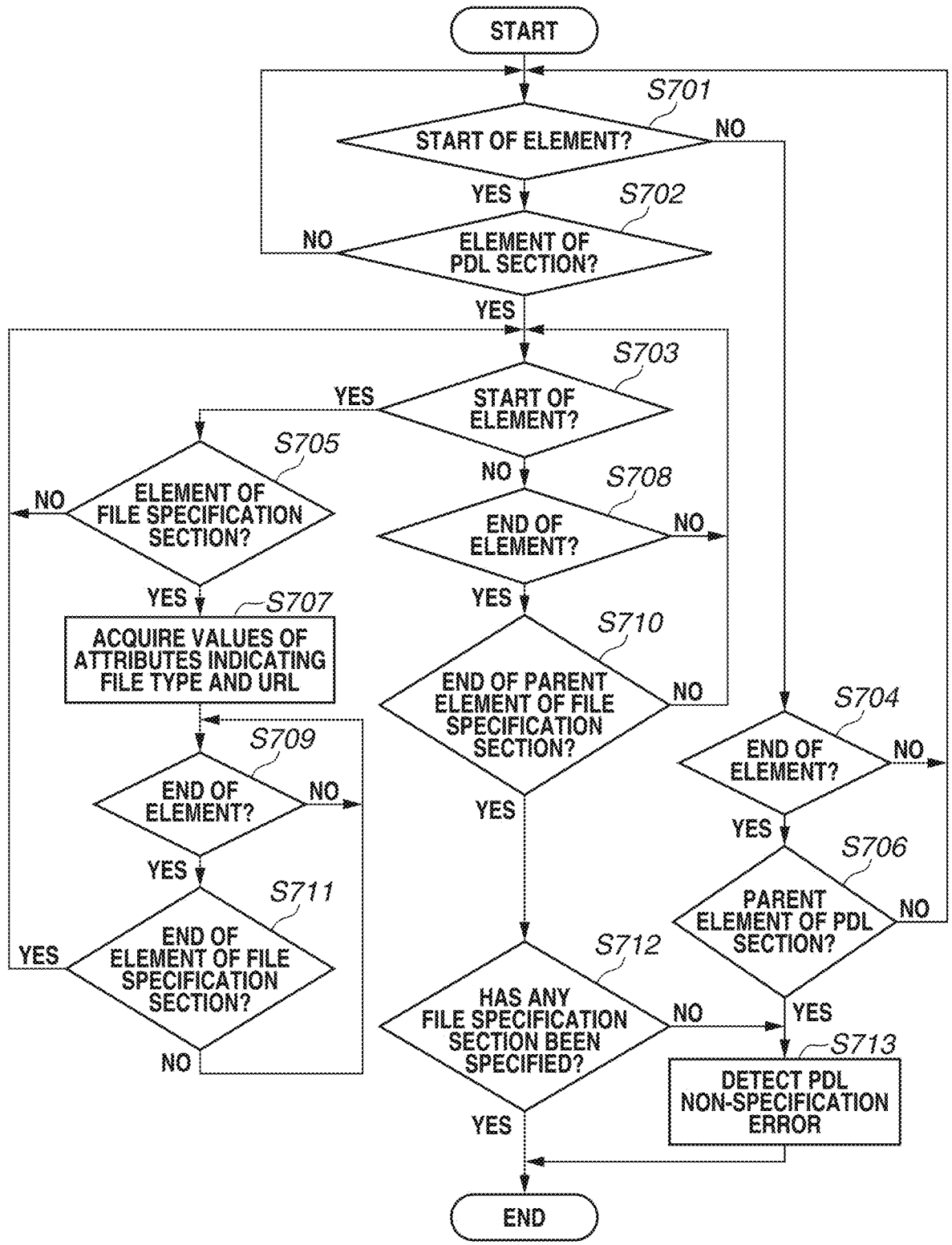
FIG. 7 is a flowchart for describing a flow of analysis processing that the control unit performs to acquire a page description language (PDL) section of a job ticket.

FIG. 7 is a flowchart illustrating a processing flow of the control unit 205 in analyzing only the PDL section of the JDF part in step S605. The control unit 205 analyzes the JDF part by operating the JDF analysis unit 835. As described above, the control unit 205 may read the JDF file or directly analyze the JDF data received in step S604. Since an XML syntax error can occur in any of the following steps, a description thereof will be omitted. If an XML syntax error is detected, the processing flow ends.

In step S701, the control unit 205 determines whether a start of an element is detected. If a start of an element is detected (YES in step S701), the processing proceeds to step S702. If not (NO in step S701), the processing proceeds to step S704. In step S702, the control unit 205 determines whether the start of the element detected in step S701 is an element of a PDL section. In the case of JDF, the PDL section starts with a start of a "JDF/ResourcePool/RunList" element. For simplification of the flowchart, element-by-element determinations are omitted. In fact, determinations are made on the "JDF", "ResourcePool", and "RunList" elements one by one, and the PDL section is determined to start at a stage where the "RunList" element is determined. If the start of the element detected is an element of the PDL section (YES in step S702), the processing proceeds to step S703. If not (NO in step S702), the processing proceeds to step S701. In step S703, the control unit 205 determines whether a start of an element is detected. If a start of an element is detected (YES in step S703), the processing proceeds to step S705. If not (NO in step S703), the processing proceeds to step S708. In step S704, the control unit 205 determines whether an end of the element is detected. If an end of the element is detected (YES in step S704), the processing proceeds to step S706. If not (NO in step S704), the processing proceeds to step S701.

In step S705, the control unit 205 determines whether the start of the element detected in step S703 is a start of an element of a file specification section. In the case of JDF, the file specification section starts with a start of a "JDF/ResourcePool/RunList/RunList/LayoutElement/FileSpec" element. Again, for simplification of the flowchart, element-by-element determinations are omitted. In fact, a start determination is made on each of the "RunList", "LayoutElement", and "FileSpec" elements subsequent to the determination of the PDL section. The file specification section is determined to start at the stage where the "FileSpec" element is detected. If the element detected is determined to start (YES in step S705), the processing proceeds to step S707. If not (NO in step S705), the processing proceeds to step S703.

In step S706, the control unit 205 determines whether the end of the element detected in step S704 is a parent element of the PDL section. Parent elements of the PDL section are the "JDF" and "ResourcePool" elements in a "JDF/ResourcePool" element. If the end of the element detected is either one of the parent elements of the PDL section (YES in step S706), the processing proceeds to step S713. If not (NO in step S706), the processing proceeds to step S701. In step S707, the control unit 205 acquires the value of an attribute indicating the file type and the value of an attribute indicating the URL of the file, and stores the values. In the case of JDF, the attribute indicating the file type is "MimeType", and the attribute indicating the URL of the file is "URL". If the attributes are not specified, a value "unspecified" is stored. After the end of the acquisition and storage of the values, the processing proceeds to step S709.

In step S708, the control unit 205 determines whether an end of the element is detected. If an end of the element is detected (YES in step S708), the processing proceeds to step S710. If not (NO in step S708), the processing proceeds to step S703. In step S709, the control unit 205 determines whether an end of the element is detected. If an end of the element is detected (YES in step S709), the processing proceeds to step S711. If not (NO in step S709), the processing remains at step S709. In other words, the control unit 205 ignores analysis events until an end of the element is detected.

In step S710, the control unit 205 determines whether the end of the element detected in step S708 is an end of a parent element of the file specification section. Parent elements of the file specification section are the "RunList" and "LayoutElement" elements after the PDL section in the "JDF/ResourcePool/RunList/RunList/LayoutElement" element. If an end of a parent element of the file specification section is detected, the acquisition of the values of the file specification section ends. If an end of a parent element of the file specification section is detected (YES in step S710), the processing proceeds to step S712. If not (NO in step S710), the processing proceeds to step S703.

In step S711, the control unit 205 determines whether the end of the element detected in step S709 is an end of the element of the file specification section. The element of the file specification section is the "FileSpec" element. If an end of the element of the file specification section is detected (YES in step S711), the processing proceeds to step S703. If not (NO in step S711), the processing proceeds to step S709. In step S712, the control unit 205 determines whether any file specification section has been specified in step S705. If any file specification section has been specified (YES in step S712), the processing flow ends. If no file specification section has been specified (NO in step S712), the processing proceeds to step S713. In step S713, the control unit 205 detects a PDL non-specification error. The PDL non-specification error occurs if an end of any of the parent elements of a PDL section is detected without detecting a start of the PDL section, or if an end of any of the parent elements of a file specification section is detected without detecting the file specification section. After the detection of the PDL non-specification error, the processing flow ends.

Figure 8A:
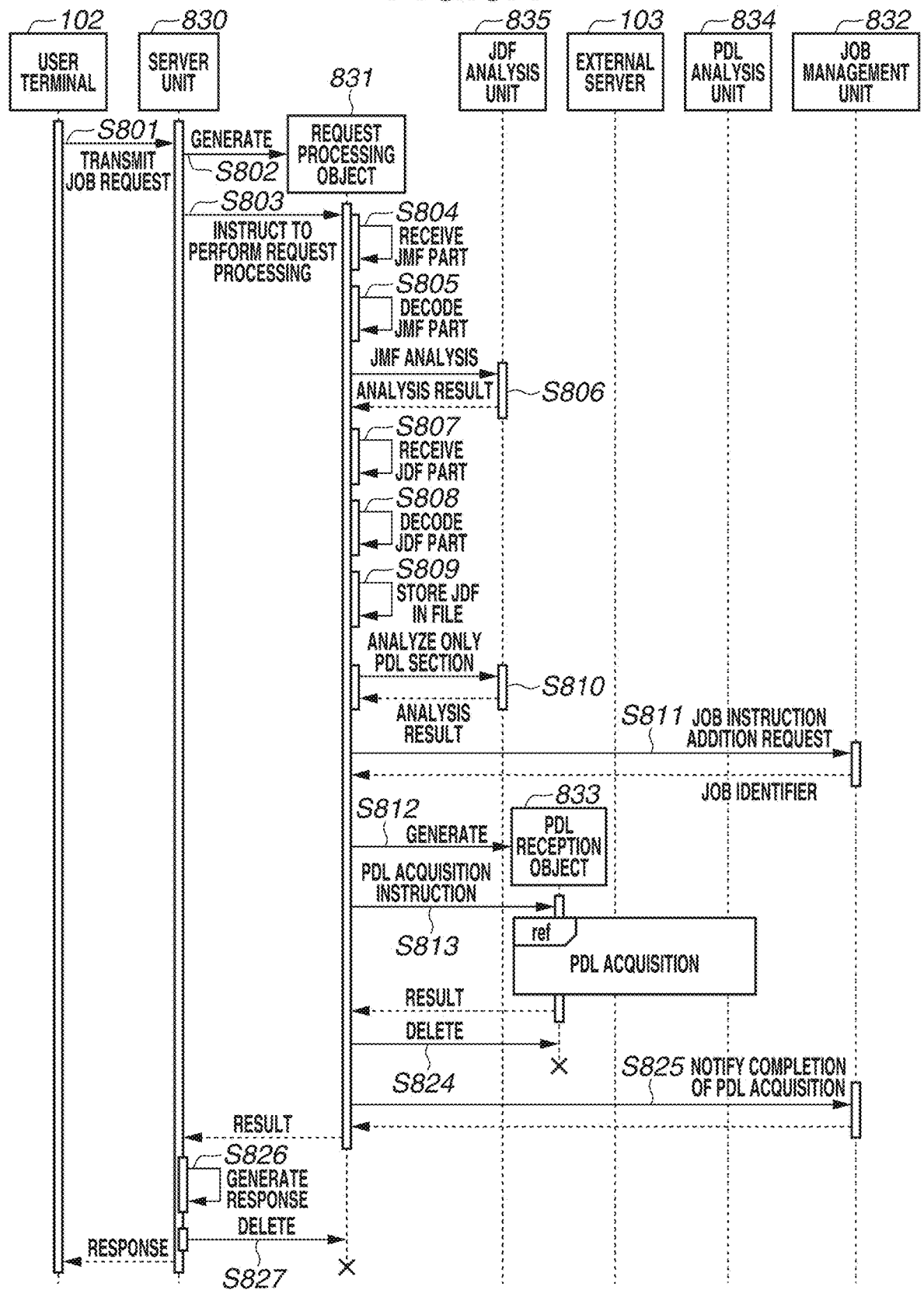
FIG. 8A is a sequence diagram for describing a processing flow of the entire print processing system when a job is accepted.
Figure 9:
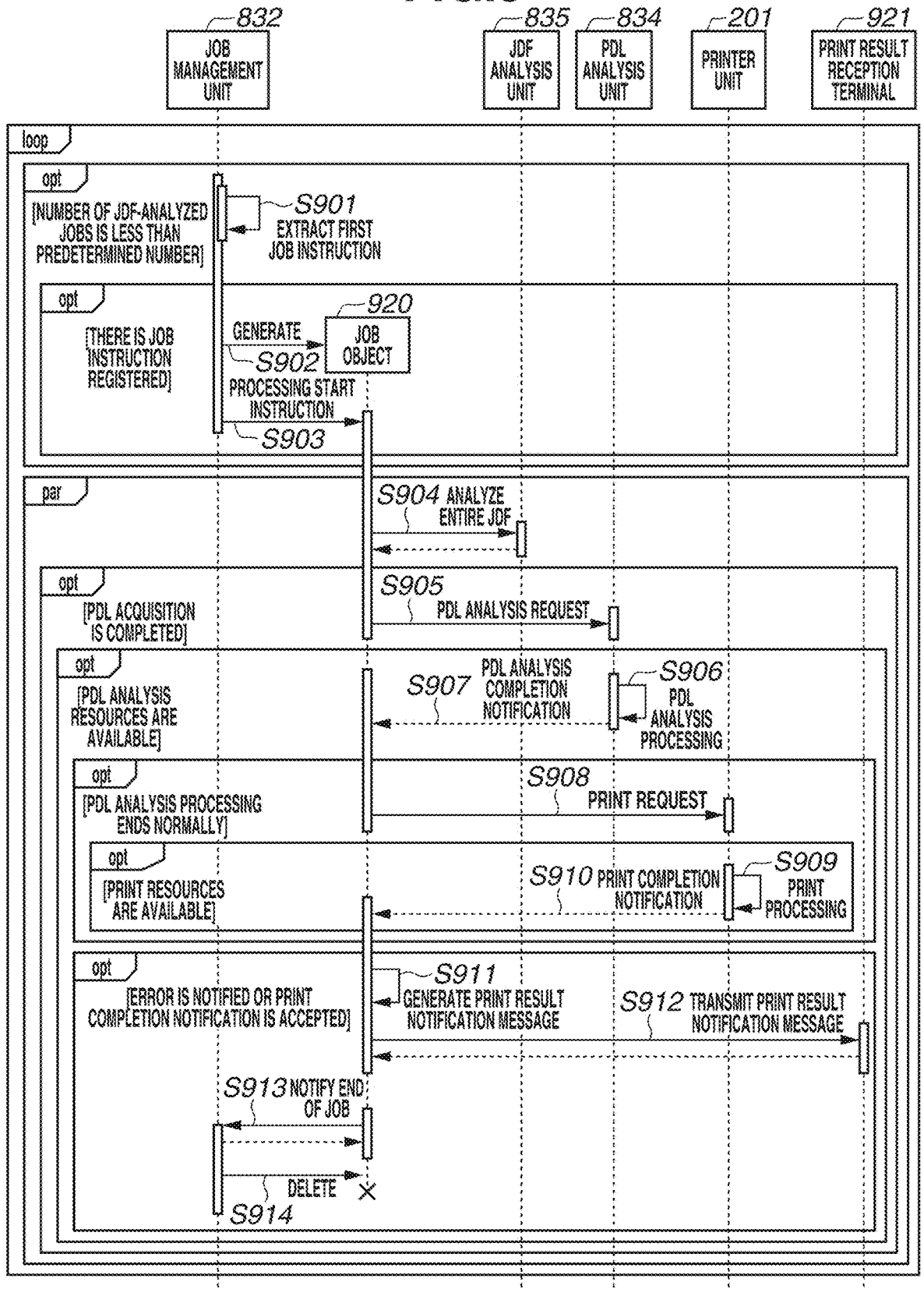
FIG. 9 is a sequence diagram for describing a processing flow of the entire print processing system after job registration.

Sequence Diagrams Illustrating Processing Flow of Entire Print Processing System in Accepting Job FIGS. 8A, 8B, and 9 are sequence diagrams illustrating a processing flow of the entire print processing system in accepting a print job (hereinafter, may be referred to simply as a job). While a processing flow has been described with a focus on the job in FIG. 6, a processing flow will now be described with reference to FIGS. 8A and 8B with a focus on processing agents. FIG. 9 is a sequence diagram illustrating a processing flow with respect to jobs registered in the job management unit 832. The processing illustrated in FIGS. 8A and 8B and the processing illustrated in FIG. 9 are performed in parallel.

To facilitate understanding of the diagrams, the entire processing is illustrated in FIG. 8A, and the processing of a PDL acquisition unit will be described with reference to FIG. 8B. The components of the information processing apparatus 102 are controlled by the CPU 301. The components of the image forming apparatus 101 are controlled by the control unit 205.

In step S801, a user terminal, i.e., the information processing apparatus 102 transmits a job request including print job data to the image forming apparatus 101. In the case of JDF, the user terminal 102 usually transmits print job data including JMF and JDF parts put together in a MIME format by using the HTTP or Hypertext Transfer Protocol Secure (HTTPS). A configuration of the print job data will be described below with reference to FIG. 10A. The print job data can be transmitted from one terminal or a plurality of terminals at the same time. The subsequent processing is performed on each piece of transmitted print job data in parallel. An execution result of the print instruction is transmitted as a response to the job request.

In step S802, a server unit 830 of the image forming apparatus 101 generates a request processing object 831. One request processing object 831 is generated for reception of one piece of print job data. The server unit 830 is a unit for transmitting and receiving data and is generated by the control unit 205 executing the data transmission and reception program 402. In step S803, the server unit 830 instructs the request processing object 831 to perform request processing. In step S804, the request processing object 831 receives a JMF part from the print job data. In step S805, the request processing object 831 decodes the received JMF part. The print job data generated in the MIME format is encoded by a format such as a Base64 format. The JMF part does not necessarily need to be encoded, and the processing of this step is skipped if the JMF part is not encoded. The request processing object 831 can determine the presence or absence of encoding and the format of encoding by referring to the header of the JMF part. In step S806, the JDF analysis unit 835 analyzes the JMF part. A case is cited where, as a result of the analysis, the message specified in the JMF part is found to be a SubmitQueueEntry command that is a print instruction. The analysis result is returned to the request processing object 831.

In step S807, the request processing object 831 receives a JDF part from the print job data. In step S808, the request processing object 831 decodes the received JDF part. The request processing object 831 decodes the JDF part as with the JMF part in step S805. In step S809, the request processing object 831 stores the received JDF part in a file. In step S810, the JDF analysis unit 835 analyzes only the PDL section of the JDF part and stores the resulting values. The analysis method is described above with reference to FIG. 7. The values to be stored are described above with reference to FIG. 7 and will be described below with reference to FIGS. 10A and 10B.

In step S811, the request processing object 831 issues a job instruction addition request to the job management unit 832. The job management unit 832 is a unit for performing job management and is generated by the control unit 205 executing the job management program 411. Receiving the job instruction addition request, the job management unit 832 returns a job identifier identifying a job instruction.

In step S812, the request processing object 831 generates a PDL reception object 833. In step S813, the request processing object 831 issues a PDL acquisition instruction to the PDL reception object 833. The processing of the PDL reception object 833 that has received the PDL acquisition instruction will be described below with reference to FIG. 8B. In step S824, the request processing object 831 deletes the PDL reception object 833. In step S825, the request processing object 831 notifies the job management unit 832 of the completion of the PDL acquisition. Here, the request processing object 831 specifies the job identifier acquired in step S811 to identify which job the notification is about. In step S826, the server unit 830 generates a response indicating the execution result of the received print instruction. Examples of the response will be described below with reference to FIGS. 11A, 11B, and 11C. In step S827, the server unit 830 deletes the request processing object 831.

A processing flow related to the PDL acquisition illustrated in FIG. 8B will now be described. A case where the URL of a file is specified by using the HTTP is described below.

Steps S814 to S823 are performed as many times as the number of PDL files specified. The number of PDL files refers to the number of file specification sections detected in step S705. Steps S814 to S817 are performed if a PDL file is specified to be acquired from outside. Steps S818 to S822 are performed if a PDL file is specified to be included in the print job file. The specification methods have been described above with reference to FIG. 6. In step S814, the PDL reception object 833 transmits a PDL acquisition request to the external server 103 indicated by the URL of the PDL file. In the case of the HTTP, the POST method is used. The external server 103 may be the same information processing apparatus 102 as the user terminal, or a different terminal.

In step S815, the PDL reception object 833 refers to the header of the received response and performs a consistency check about whether the PDL file can be received and whether the JDF specifications match. Whether a connection to the external server 103 fails and whether there is no response are also determined here. If inconsistency or an error is detected by the consistency check, the processing in step S610, which is performed when an error is determined to have occurred, follows. The subsequent processing illustrated in FIG. 8B is aborted, and the PDL reception object 833 returns an error as a response to the PDL acquisition instruction given in step S813. Steps S816 and S817 are continued until the PDL file is received up to the end of the file or the occurrence of a reception error is detected. If the occurrence of the reception error is detected, the subsequent processing is aborted, and the PDL reception object 833 returns an error as the response to the PDL acquisition instruction given in step S813.

In step S816, the PDL reception object 833 receives the PDL file as much as a predetermined amount or up to the end of the file from the response. The predetermined amount depends on the size of the reception buffer. If the end of the file is detected before the predetermined amount of the file is read, the PDL reception object 833 ends the reception. In step S817, the PDL reception object 833 transmits the PDL file received as much as the predetermined amount or up to the end of the file to the PDL analysis unit 834. The PDL analysis unit 834 is a unit for analyzing a PDL file and is generated by the control unit 205 executing the PDL function program 405.

In step S818, the PDL reception object 833 receives a MIME part header from the job request accepted from the user terminal 102. In step S819, the PDL reception object 833 refers to the received MIME part header and performs a consistency check about whether the PDL file can be received and whether the JDF specifications match. Whether there is no MIME part, i.e., whether the MIME part header fails to be received is also determined here. If there is no MIME part, the print job data is determined to have data yet to be acquired in step S609. If the JDF specifications and the file type do not match, the file types are determined to not coincide in step S611. In either case, the subsequent processing is aborted, and the PDL reception object 833 returns an error as a response to the PDL acquisition instruction given in step S813. Steps S820 to S822 are continued until the PDL file is received up to the end of the file or the occurrence of a reception error is detected. If the occurrence of a reception error is detected, the subsequent processing is aborted, and the PDL reception object 833 returns an error as a response to the PDL acquisition instruction given in step S813.

In step S820, the PDL reception object 833 receives the PDL file as much as a predetermined amount or up to the end of the file from the job request. In step S821, the PDL reception object 833 decodes the received PDL file. In step S822, the PDL reception object 833 transmits the PDL file received and decoded as much as a predetermined amount or up to the end of the file to the PDL analysis unit 834. In step S823, the PDL reception object 833 notifies the PDL analysis unit 834 of the end of the PDL acquisition.

The processing of steps S901 to S903 is performed only if the number of JDF-analyzed jobs is less than the predetermined number.

In step S901, the job management unit 832 extracts the first job instruction among the job instructions registered. A job instruction is registered by receiving a job instruction addition request from the request processing object 831 in step S811. The processing of steps S902 and S903 is performed only if any job instruction is registered. In step S902, the job management unit 832 generates a job object 920. In step S903, the job management unit 832 gives a processing start instruction to the job object 920. The processing of steps S904 to S914 is performed in parallel with the processing of steps S901 to S903. More specifically, the job management unit 832 instructs the job object 920 to start processing in step S903, and returns to step S901. In step S904, the JDF analysis unit 835 analyzes the entire JDF part of the job. The JDF analysis has been described above with reference to FIG. 6.

Step S905 is performed when the PDL acquisition corresponding to the job object 920 is completed. The PDL acquisition is completed by accepting a completion notification from the request processing object 831 in S825. In step S905, the job object 920 issues a PDL analysis request to the PDL analysis unit 834. This processing is performed asynchronously. Step S906 is performed when the PDL analysis resources become available. In step S906, the PDL analysis unit 834 performs PDL analysis processing. As described above, the availability of the PDL analysis resources depends on the number of jobs and the number of pages that can be analyzed at the same time. If there is no PDL analysis resources available, the PDL analysis unit 834 waits until the PDL analysis resources become available.

In step S907, the PDL analysis unit 834 transmits a PDL analysis completion notification to the job object 920 as a message about the asynchronous processing of step S906. Steps S908 to S910 are performed if the PDL analysis processing performed in step S906 ends normally and if the normal termination is notified in step S907. If an error occurs and is notified, the job object 920 performs step S911. In step S908, the job object 920 issues a print request to the printer unit 201. This processing is performed asynchronously. Step S909 is performed when print resources become available. As described above, the availability of the print resources depends on the number of jobs that can be printed at the same time. The number of jobs that can be printed at the same time is usually one, and the printer unit 201 performs print processing on the job of which the print request is first accepted. If there is no print resources available, the printer unit 201 waits until the print resources become available.

In step S909, the printer unit 201 performs the print processing. In step S910, the printer unit 201 transmits a print completion notification to the job object 920 as a message about the asynchronous processing of step S909.

Steps S911 to S914 are performed if an error is notified as a PDL analysis result in step S907 or if the print completion notification is accepted in step S910. In step S911, the job object 920 generates a print result notification message. Examples of the print result notification message include a JMF message such as a ReturnQueueEntry command. In step S912, the job object 920 transmits the print result notification message generated in step S911 to a print result reception terminal 921. The print result reception terminal 921 may be the same information processing apparatus 102 as the user terminal from which the job request is accepted, or a different terminal. In step S913, the job object 920 notifies the job management unit 832 of the end of the job. The job object 920 also notifies the job management unit 832 of a normal termination, an error termination, and the cause of the error as an end status. In step S914, the job management unit 832 deletes the job object 920.

Schematic Diagrams Illustrating Configuration of Print Job Data and JDF

Figure 10A:
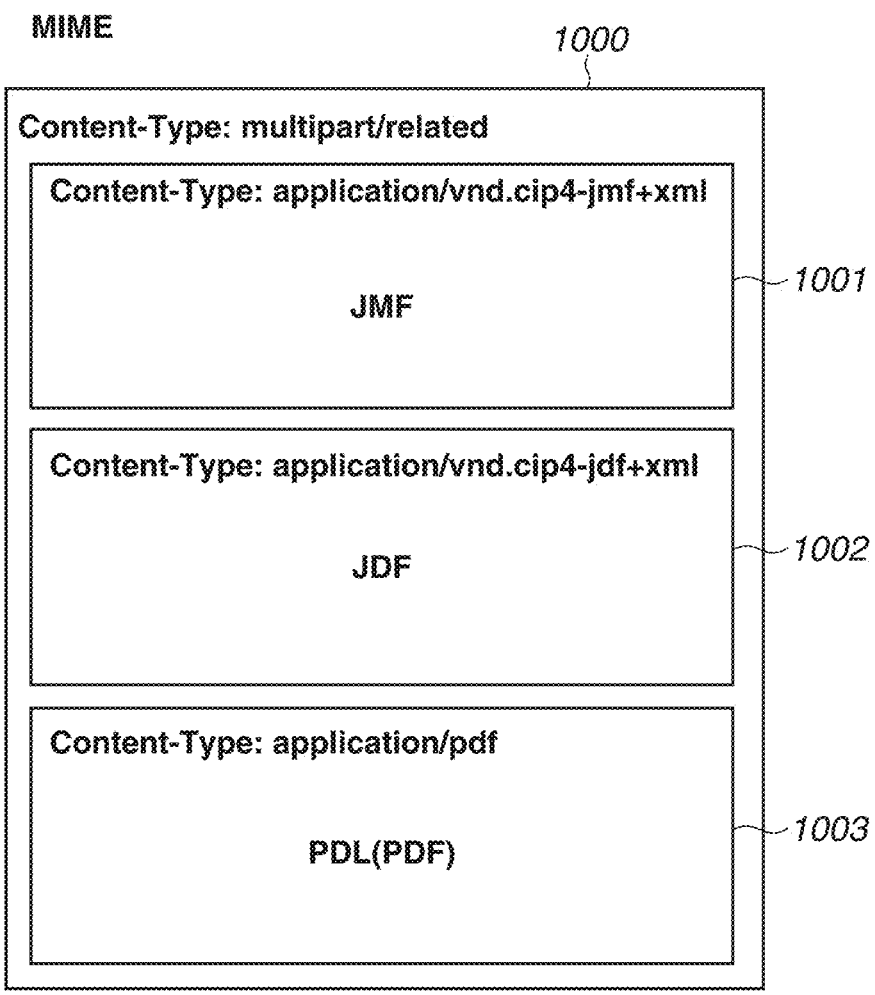
FIG. 10A illustrates an example of a configuration of data transmitted from the information processing apparatus by a job request.

FIGS. 10A and 10B are schematic diagrams illustrating a configuration of print job data received from the information processing apparatus 102 and a JDF included in the print job data.

FIG. 10A illustrates a data configuration when the print job data is a print instruction request using JDF.

MIME data 1000 includes JMF, JDF, and PDL files constituting the print job data, connected in a MIME format. MIME is a scheme devised so that various files can be handled in an email. The files constituting MIME are connected as parts delimited by character strings called boundaries. Each part contains a part header at the top. The part header describes information about the file(s) included in the part.

A JMF part 1001 is a MIME part containing a JMF file. The present exemplary embodiment deals with a case where the JMF file contains a SubmitQueueEntry command for giving a print instruction. The JMF part 1001 is the only part that is always included in the MIME data 1000 in carrying out the present exemplary embodiment. The JMF part 1001 is always included as the first MIME part. Without other parts, the JMF part 1001 does not need to be put into the MIME format.

A JDF part 1002 is a MIME part containing a JDF file. Any print-related specifications can be described in the JDF file. A PDL section 1013 is a print specification that is always included in carrying out the present exemplary embodiment. The JDF part 1002 will be described below with reference to an example illustrated in FIG. 10B. The JMF part 1001 may specify the URL of a storage location where the JDF file is stored instead of simultaneously transmitting the JDF file. If such a specification method is employed, the JDF part 1002 is not included in the MIME data 1000.

A PDL part 1003 is a MIME part containing a PDL file. FIG. 10A illustrates a case where the PDL part 1003 contains a Portable Document Format (PDF) file. Unlike the JMF part 1001 and the JDF part 1002, the MIME data 1000 can include a plurality of PDL parts 1003 or no PDL part 1003. The number of PDL parts 1003 refers to the number of files specified to be simultaneously transmitted among PDL file specifications described in the PDL section 1013. If the number of PDL parts 1003 does not coincide with and is less than the number specified in the PDL, section 1013, an error is detected in steps S819 and S609. If the PDL part 1003 is binary data, the PDL part 1003 is always encoded by a format such as Base64.

FIG. 10B illustrates an example of JDF part handled in the present exemplary embodiment. Various print specifications can be included in the JDF part. Only sections related to the present exemplary embodiment will be described here.

A JDF section 1011 is a section described in a JDF element. The description of the JDF part 1010 always starts with the JDF section 1011. If a root element is not the JDF element, the control unit 205 detects an XML syntax error in step S605. A resource section 1012 is a section describing resources to be used for printing. The resource section 1012 describes values specifying settings, print files, and print sheets to be used for printing. In the present exemplary embodiment, the specifications in the resource section 1012 are indispensable. If there is no specification in the resource section 1012, the control unit 205 detects the PDL non-specification error in step S713.

The PDL section 1013 is a section for specifying the PDL file(s) to be used for printing. In the present exemplary embodiment, the specifications in the PDL section 1013 are indispensable. If there is no specification in the PDL section 1013, the control unit 205 detects the PDL non-specification error in step S713. A plurality of PDL files can be specified in the PDL section 1013. FIG. 10B illustrates two PDL file specification sections 1014 and 1015. At least one PDL file specification is indispensable. If there is no specification, the control unit 205 detects the PDL non-specification error in step S713. The PDL file specification sections 1014 and 1015 include three hierarchical elements, namely, "RunList", "LayoutElement", and "FileSpec" elements. Of these, file value specification sections 1016 and 1017 in the "FileSpec" elements actually specify the values to be used. The "FileSpec" elements are indispensable. If no specification is included in the "FileSpec" element, a syntax error is detected. If there is no PDL file specification section 1014 or 1015, the control unit 205 detects the PDL non-specification error in step S713.

The file value specification sections 1016 and 1017 are sections describing the values indicating the files to be used for printing. In the present exemplary embodiment, at least URL attributes 1019 and 1021 and Mime Type attributes 1018 and 1020 are specified. If a start of the file value specification section 1016 or 1017 is detected, the control unit 205 acquires and stores the values of the URL and MimeType attributes in step S707. The control unit 205 does not acquire the values of the other attributes. If no attribute is specified, the control unit 205 stores a value "unspecified", and detects a file information non-specification error in step S606. The URL attributes 1019 and 1021 are attributes specifying the storage locations of the PDL files. An URL includes the type of URL scheme for acquiring a file and the path of the file. In the present exemplary embodiment, "http" and "cid" (Content Interactive Delivery (CID)) are supported as URL schemes. If an unsupported URL scheme is specified, the control unit 205 detects an unsupported URL scheme specification error in step S606. If "cid" is specified as the URL scheme, the control unit 205 determines in step S607 that the print job data includes a PDL file, and receives the PDL file from the print job data in step S613. If a URL scheme other than "cid" is specified to be supported, the control unit 205 acquires the PDL file from the path specified in step S608 by using the specified URL scheme.

Examples of Response to Job Request and Types of Errors

FIGS. 11A, 11B, and 11C illustrate examples of messages that are each generated in step S826 and transmitted as a response to the job request accepted from the user terminal 102 in step S801.

FIG. 11A illustrates an example of the message when the processing up to the PDL acquisition ends non ally without causing an error. FIG. 11B illustrates an example of the message when an error occurs in the PDL acquisition, where a file with the value "http://172.12.13.123/document.pdf" specified in its URL attribute fails to be acquired. FIG. 11C illustrates types of errors detected in steps S606, S610, S609, and S611, and examples of error messages.

A PDL acquisition normal termination response message 1100 is transmitted to the user terminal 102 that is the sender of the job request as a response if the processing up to the PDL acquisition ends normally. The PDL acquisition normal termination response message 1100 includes a request execution result 1101 indicating that the job request is normally terminated, and generated job information 1102 about the generated job.

A PDL acquisition error response message 1110 is transmitted to the user terminal 102 that is the sender of the job request as a response if an error has occurred in the processing up to the PDL acquisition. The PDL acquisition error response message 1110 includes a request execution result 1111 indicating that the job request is terminated due to an error, generated job information 1112 about the generated job, and error information 1113 about the error occurred. The error information 1113 includes information indicating the level of the error and an error message 1114. If an error is detected before job generation, i.e., in step S606, no generated job information 1112 is included. The types of errors and examples of the error message 1114 will be described with reference to FIG. 11C.

An error generating factor and error message table 1120 illustrates possible factors of errors occurring in the processing up to the PDL acquisition and examples of messages described in the error message 1114 in the respective cases. JDF analysis errors 1121 that can occur in the analysis of the PDL section in the JDF in step S605 and be determined in step S606 and PDL acquisition errors 1122 that can occur during the PDL acquisition and be determined in steps S610, S609, and S611 are different in the nature of the errors. Errors are determined at respective points, and the subsequent processing is aborted in case of error detection, whereby the occurrence of useless processing is reduced.

Description of Effects

Figure 12A:
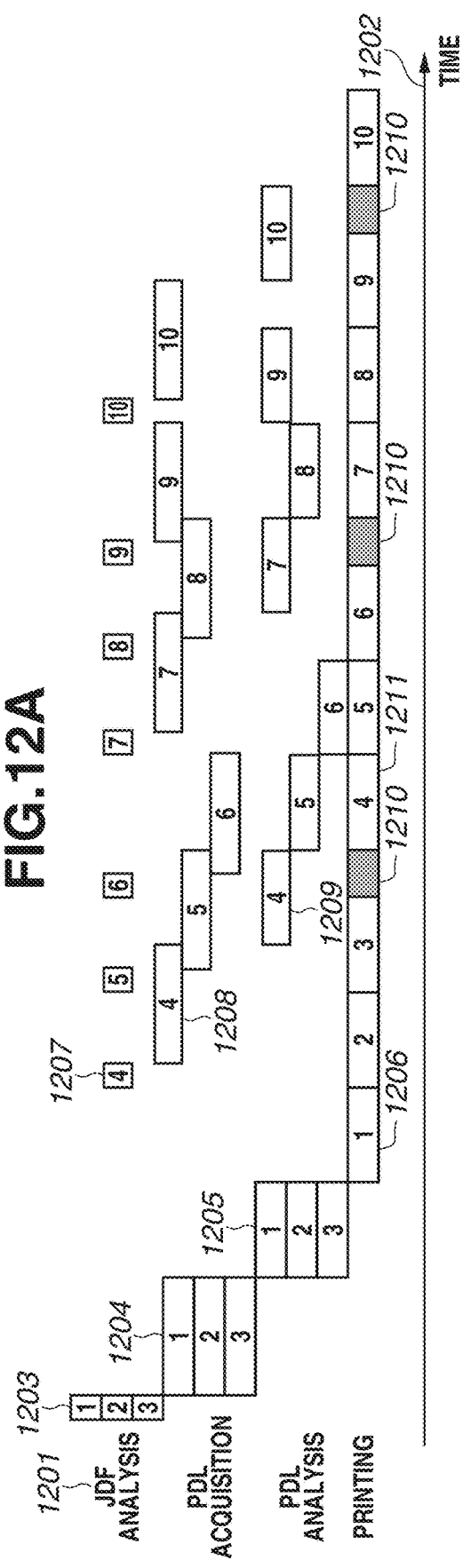
FIGS. 12A and 12B are diagrams for describing an effect.
Figure 12B:
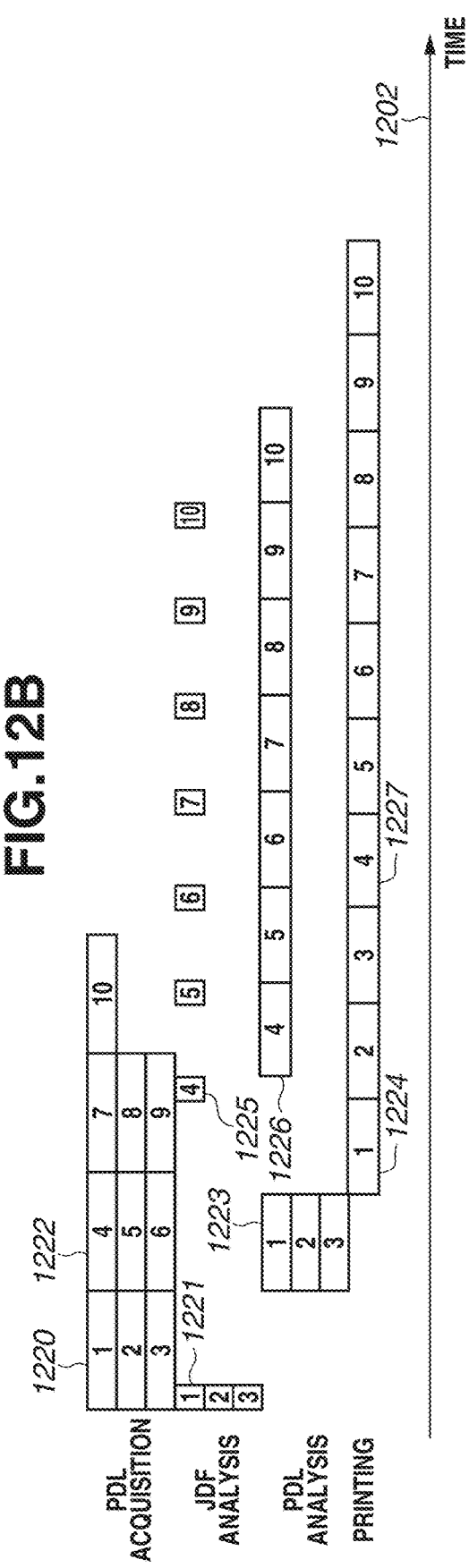

FIGS. 12A and 12B are diagrams for describing the effects of the present exemplary embodiment. FIGS. 12A and 12B illustrate processing to be performed and transition of target jobs when ten or more job requests are accepted in succession. The number of jobs that can be JDF-analyzed at the same time is three. PDL analysis resources are provided in the same number of jobs, i.e., three jobs. The number of jobs capable of PDL acquisition at the same time is the same number, i.e., three. Print resources are provided for one job. Processing descriptions 1201 are arranged in a column. A horizontal axis 1202 indicates the passage of time. Each frame represents the time when the described processing is performed. Numbers in the frames are job numbers assigned to distinguish the jobs. Processing times given the same number represent the times when processing for the same job is performed. For simplification of description, all the jobs have the same contents and take the same time to process.

FIG. 12A is a schematic diagram illustrating processing times in a case where the JDF files are fully analyzed before PDL acquisition without using the present exemplary embodiment. FIG. 12B is a schematic diagram illustrating processing times in a case where the present exemplary embodiment is used.

If the present exemplary embodiment is not used, first, as many JDF files as the number of jobs that can be JDF-analyzed at the same time are fully analyzed. Compared to the processes of PDL acquisition, PDL analysis, and printing, the JDF analysis has a relatively short processing time. Since the JDF analysis can be performed up to three jobs, a job 1 is JDF-analyzed in processing time 1203 in parallel with jobs 2 and 3. Next, the PDL files of the JDF-analyzed jobs are acquired. Since the PDL acquisition starts after the JDF analysis, the PDL acquisition of the job 1 is performed in processing time 1204 in parallel with that of the jobs 2 and 3. The acquisition time of a PDL file depends largely on the size of the PDL file and the line speed. Next, the acquired PDL files are analyzed. Since the PDL analysis is performed after the PDL acquisition, the PDL analysis of the job 1 is performed in processing time 1205 simultaneously with that of the jobs 2 and 3. Next, printing is performed. Printing is performed after the PDL analysis, i.e., in processing time 1206. Since the printing can be performed only on one job at a time, the printing of the jobs 2 and 3 is executed at timing when the printing of the jobs 1 and 2 is completed, respectively. Then, since the end of the printing of the job 1 reduces the number of JDF-analyzed jobs, a JDF analysis of a next job 4 can be performed. The job 4 is JDF-analyzed after the completion of the printing of the job 1, i.e., in processing time 1207. Subsequently, the PDL acquisition of the job 4 is similarly performed in processing time 1208, the PDL analysis thereof in processing time 1209, and the printing thereof in processing time 1211. As illustrated in FIG. 12A, a job interval 1210 occurs in the print processing. The job interval 1210 not only lowers the printing efficiency during this period, but can also cause a cycle-down that entails adjustments to sheet intervals and temperature, causing more deterioration in the printing efficiency than from the job interval 1210. The same applies to the subsequent jobs, and the job interval 1210 occurs after every three jobs.

On the other hand, if the present exemplary embodiment is used, the PDL acquisition is started in processing time 1220 once the PDL sections of the JDF parts are acquired. The processing times for analyzing the PDL sections of the JDF parts are sufficiently shorter than those of the other processes and thus are omitted from FIG. 12B. JDF parts as many as the number of jobs that can be JDF-analyzed at the same time are fully analyzed in processing time 1221 in parallel with the PDL acquisition. The PDL acquisition and the JDF analysis of the job 1 are performed in parallel with those of the jobs 2 and 3. Immediately after the end of the PDL acquisition of the job 1, the PDL acquisition of the subsequent job 4 is started. Since the PDL section of the JDF part of the job 4 can be analyzed during the PDL acquisition of the job 1, the processing time thereof is not taken into account. In this example, since the PDL acquisition of the jobs 1, 2, and 3 is completed at the same time, the PDL acquisition of jobs 4, 5, and 6 is performed in parallel in processing time 1222. The PDL analysis of the jobs 1, 2, and 3 can be performed after the completion of the JDF analysis and the PDL acquisition, and is thus performed in processing time 1223. The job 1 can be printed after the PDL analysis, and is thus printed in processing time 1224. The printing of the jobs 2 and 3 is executed at timing when the printing of the preceding jobs 1 and 2 is completed, respectively. The JDF analysis of the job 4 can be performed at timing when the number of JDF-analyzed jobs decreases, and is thus performed in processing time 1225 after the completion of the printing of the preceding job 1. The PDL analysis of the job 4 can be performed after the JDF analysis, and is thus performed in processing time 1226. The job 4 can be printed after the PDL analysis and when the printing of the job 3 is completed, and is thus printed in processing time 1227. As illustrated in FIG. 12B, if the present exemplary embodiment is used, no job interval occurs in the print processing. Thus, the use of the present exemplary embodiment can improve the printing efficiency and prevent the occurrence of a cycle-down as well.

In the foregoing example, all the jobs are described to be printed. However, the present exemplary embodiment is also effective in a case where a preceding job is cancelled. For example, a case is cited where in the illustrated examples, the jobs 5 and 6 are cancelled while the job 4 is being printed. If the present exemplary embodiment is not used, the printing of a job 7 is unable to be started unless the JDF analysis, PDL acquisition, and PDL analysis of the job 7 are all performed. By contrast, if the present exemplary embodiment is used, the printing of the job 7 can be started by performing the JDF and PDL analyses since the PDL acquisition has already been completed.

Whether a PDL file is included in print job data is unable to be determined until the PDL section of the JDF part is analyzed. If a PDL file is included, connection with the user terminal 102 is desirably maintained until the reception ends. Thus, with and without the use of the present exemplary embodiment, there is a large difference in time to maintain a session. Since the number of sessions that can be connected at the same time is limited, early disconnection of the sessions enables the user to transmit next jobs earlier so that the image forming apparatus 101 can accept job requests from other users.

Issues in terms of performance and under resource limitations in the case of not using the present exemplary embodiment will be specifically described.

Since the path of a PDL file stored outside is described in a JDF file, the PDL file is unable to be acquired unless the JDF file is analyzed. Thus, starting the acquisition of the PDL file based on the JDF analysis (full analysis of the JDF) delays the start of printing and causes a drop in the printing efficiency. Moreover, the occurrence of a time where print processing is not performed between the jobs due to a delay in the PDL analysis processing can cause a cycle-down that entails adjustments to the conveyance intervals of sheets and the temperature of the fixing device. This significantly deteriorates the printing efficiency.

Since the JDF file can specify various print settings page by page and is likely to include a large volume of XML data, large memory resources are used to retain the analysis result. A built-in product with severe limitations on memory use function by function has difficulty in analyzing all JDF files received and retaining all analysis results if many JDF files are received. For such a reason, the number of jobs to be JDF-analyzed is limited. This results in a delay in the start of the PDL acquisition and leads to a drop in performance.

As described above, the present exemplary embodiment is most effective for the built-in product with severe resource limitations. However, the present exemplary embodiment is also effective for a product other than the built-in product. While improved device performance improves the PDL analysis and the PDL analysis speed, the time taken to acquire a PDL file via a network depends largely on a network environment of the location where the device is installed and a current usage condition of the line. As illustrated in FIGS. 12A and 12B, the longer the time taken to acquire a PDL file, the more likely the job interval 1210 is to occur and the longer the job interval 1210 itself. Since a JDF file can also describe various settings other than the print settings, it is wasteful in terms of resource efficiency and performance for a printing machine handling a JDF file to analyze all the values. Thus, the present technique of analyzing only values to be used for PDL acquisition and starting the PDL acquisition immediately after the acquisition of the values can be expected to be effective not only for a built-in product but also for other products in terms of resource efficiency, performance, and processing speed.

According to the exemplary embodiment described above, when a job ticket is received, only a section specifying a PDL file or files is analyzed to acquire the URL(s) of the PDL file(s). After the acquisition, the analysis of the job ticket is ended to perform PDL acquisition. Accordingly, the PDL file(s) can be acquired from outside without affecting performance even in an environment with limited memory. In other words, the PDL file(s) of which the path(s) is/are specified by the JDF file and that is/are stored outside can be acquired without affecting performance or resources. This can improve the convenience of job submitters and improve the printing efficiency of the image forming apparatus 101 as well.

According to the exemplary embodiment described above, in acquiring and printing a print file based on a job ticket, the print file can be printed with improved performance compared to heretofore.

Other Embodiments

Embodiment(s) of the present disclosure also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-136292, filed Jul. 24, 2019, which is hereby incorporated by reference herein in its entirety.

What is claimed is:

1. An image forming apparatus comprising:
   a reception unit configured to receive a job ticket;
   a first analysis unit configured to analyze part of the job ticket;
   a transmission unit configured to transmit an acquisition request for a print file to an external apparatus based on a result of analysis by the first analysis unit;
   a second analysis unit configured to analyze the job ticket; and
   a control unit configured to control printing based on a result of analysis by the second analysis unit and the print file acquired from the external apparatus based on the acquisition request to the external apparatus.

2. The image forming apparatus according to claim 1, wherein the first analysis unit is configured to analyze a print file description section of the job ticket.

3. The image forming apparatus according to claim 1, wherein the second analysis unit is configured to analyze the entire job ticket.

4. The image forming apparatus according to claim 1, further comprising a storage unit configured to store the result of analysis by the second analysis unit as a job ticket-analyzed job,
   wherein, in a case where a predetermined number of job ticket-analyzed jobs are stored in the storage unit, the analysis by the second analysis unit is put on standby.

5. The image forming apparatus according to claim 4, wherein, in a case where the printing based on the result of analysis by the second analysis unit and the print file acquired from the external apparatus based on the acquisition request to the external apparatus is completed, the job ticket-analyzed job stored in the storage unit and corresponding to completion of the printing is deleted.

6. A method for controlling an image forming apparatus, comprising:
   receiving a job ticket;
   analyzing part of the job ticket as a first analysis;
   transmitting an acquisition request for a print file to an external apparatus based on a result of the first analysis;
   analyzing the job ticket as a second analysis; and
   controlling printing based on a result of the second analysis and the print file acquired from the external apparatus based on the acquisition request to the external apparatus.

7. The method for controlling an image forming apparatus according to claim 6, wherein the first analysis includes analyzing a print file description section of the job ticket.

8. The method for controlling an image forming apparatus according to claim 6, wherein the second analysis includes analyzing the entire job ticket.

9. The method for controlling an image forming apparatus according to claim 6, further comprising storing the result of the second analysis into a storage unit as a job ticket-analyzed job,
   wherein, in a case where a predetermined number of job ticket-analyzed jobs are stored in the storage unit, the second analysis is put on standby.

10. The method for controlling an image forming apparatus according to claim 9, wherein, in a case where the printing based on the result of the second analysis and the print file acquired from the external apparatus based on the acquisition request to the external apparatus is completed, the job ticket-analyzed job stored in the storage unit and corresponding to completion of the printing is deleted.

11. A non-transitory computer-readable storage medium storing a program including executable instructions, which when executed by one or more processors of an image forming apparatus, cause the image forming apparatus to:
receive a job ticket;
analyze part of the job ticket as a first analysis;
transmit an acquisition request for a print file to an external apparatus based on a result of the first analysis;
analyze the job ticket as a second analysis; and
control printing based on a result of the second analysis and the print file acquired from the external apparatus based on the acquisition request to the external apparatus.

12. An image forming apparatus comprising:
a reception unit configured to receive a job ticket;
an analysis unit configured to analyze the job ticket;
a transmission unit configured to transmit an acquistion request for a print file to an external apparatus; and
a control unit configured to control printing based on a result of analysis by the analysis unit and the print file acquired from the external apparatus based on the acquistion request to the external apparatus,
wherein the transmission unit is configured to tranmsit the acquistion request for the print file to the external apparatus based on a result of analyzing part of the job ticket.

13. The image forming apparatus according to claim 12, wherein the analysis unit is configured to analyze the part of the job ticket, and to analyze whole of the job ticket after the transmission unit transmits the acquisition request for the print file to the external apparatus.

14. The image forming apparatus according to claim 12, wherein analyzing the part of the job ticket is analyzing a print file description section of the job ticket.

15. The image forming apparatus according to claim 12, wherein the control unit is configured to control printing based on a result of analyzing whole of the job ticket by the analysis unit and the print file acquired from the external apparatus based on the acquisition request to the external apparatus.

* * * * *